(12) United States Patent
Tanaka et al.

(10) Patent No.: US 9,114,850 B2
(45) Date of Patent: Aug. 25, 2015

(54) MOTOR DRIVE CONTROL DEVICE

(71) Applicants: MICROSPACE CORPORATION, Tokyo (JP); TAIYO YUDEN CO., LTD., Tokyo (JP)

(72) Inventors: Masato Tanaka, Tokyo (JP); Kazuo Asanuma, Tokyo (JP); Yasuo Hosaka, Tokyo (JP); Hirokazu Shirakawa, Tokyo (JP)

(73) Assignees: MICROSPACE CORPORATION, Tokyo (JP); TAIYO YUDEN CO., LTD., Tokyo (JP)

( * ) Notice: Subject to any disclaimer, the term of this patent is extended or adjusted under 35 U.S.C. 154(b) by 282 days.

(21) Appl. No.: 13/851,308

(22) Filed: Mar. 27, 2013

(65) Prior Publication Data

US 2013/0311019 A1    Nov. 21, 2013

(30) Foreign Application Priority Data

May 18, 2012    (JP) .................................. 2012-114264

(51) Int. Cl.
- *B62M 6/45*    (2010.01)
- *B60L 11/00*    (2006.01)
- *B60L 15/20*    (2006.01)

(52) U.S. Cl.
CPC .................. *B62M 6/45* (2013.01); *B60L 11/007* (2013.01); *B60L 15/2054* (2013.01); *B60L 2200/12* (2013.01); *Y02T 10/7275* (2013.01)

(58) Field of Classification Search
CPC .............. B60L 11/007; B60L 2200/12; B60L 2240/423; B60L 2250/26
See application file for complete search history.

(56) References Cited

U.S. PATENT DOCUMENTS

| | | | |
|---|---|---|---|
| 5,226,501 A * | 7/1993 | Takata ..................... | 180/206.2 |
| 6,015,021 A * | 1/2000 | Tanaka et al. ............ | 180/206.2 |
| 6,516,908 B2 * | 2/2003 | Tseng ...................... | 180/206.2 |
| 7,547,021 B2 * | 6/2009 | Bon ......................... | 280/11.115 |
| 7,706,935 B2 * | 4/2010 | Dube et al. ............... | 701/22 |
| 7,779,948 B2 * | 8/2010 | Gulas ....................... | 180/206.5 |
| 8,831,810 B2 * | 9/2014 | Shoge et al. .............. | 701/22 |
| 2008/0139350 A1 | 6/2008 | Iwasa et al. | |

FOREIGN PATENT DOCUMENTS

| | | |
|---|---|---|
| EP | 0 825 102 A2 | 2/1998 |
| EP | 0 984 186 A2 | 3/2000 |
| EP | 1 129 934 A2 | 9/2001 |

(Continued)

OTHER PUBLICATIONS

Japanese Office Action dated Jan. 14, 2014 in a counterpart Japanese patent application No. 2012-114264.

(Continued)

*Primary Examiner* — Nicholas Kiswanto
(74) *Attorney, Agent, or Firm* — Chen Yoshimura LLP

(57) ABSTRACT

A motor drive control device of an electric power-assisted vehicle that has a gear shifter and a motor, and in which a first ratio of the number of drive rotations in the motor to the number of drive rotations of a pedal changes based on changes in a gear ratio in the gear shifter, includes: a gear ratio obtaining part that obtains the gear ratio of the gear shifter; and a calculating part that calculates an assist torque, which is a target value for a drive torque of the motor, from the pedal input torque based on the gear ratio obtained by the gear ratio obtaining part.

17 Claims, 28 Drawing Sheets

(56) References Cited

FOREIGN PATENT DOCUMENTS

| EP | 1 415 904 A2 | 5/2004 |
|----|----|----|
| EP | 2 394 902 A1 | 12/2011 |
| EP | 2 447 108 A1 | 5/2012 |
| JP | H7-309283 A | 11/1995 |
| JP | H08 80891 A | 3/1996 |
| JP | H09-286376 A | 11/1997 |
| JP | 2000-145934 A | 5/2000 |
| JP | 3190491 B2 | 7/2001 |
| JP | 2002-240772 A | 8/2002 |
| JP | 2003-104278 A | 4/2003 |
| JP | 2004-243920 A | 9/2004 |
| JP | 2008-144774 A | 6/2008 |

OTHER PUBLICATIONS

European Search Report dated Jul. 23, 2013 in a counterpart European patent application No. 13002506.7.
Japanese Office Action dated Aug. 12, 2014 in a counterpart Japanese patent application No. 2012-114264.
European Search Report dated Sep. 24, 2013 in a counterpart European patent application No. 13002506.7.

* cited by examiner

MOTOR DRIVE CONTROL DEVICE

This application claims the benefit of Japanese Application No. 2012-114264, filed in Japan on May 18, 2012, which is hereby incorporated by reference in its entirety.

BACKGROUND OF THE INVENTION

1. Field of the Invention

The present invention relates to a motor drive control device for a so-called electric power-assisted vehicle such as a bicycle with a motor.

2. Description of Related Art

Power transmission systems of an electric power-assisted bicycle include several variations shown in FIGS. 1 to 5. For these configurations, a one-way clutch is installed on the rear wheel gear (hereinafter referred to as an R gear). A decelerator may or may not be provided depending on the torque and speed characteristics of the motor.

FIG. 1 shows a first configuration in which a transmission system that transmits torque from a motor to a rear wheel and a transmission system that transmits torque from a pedal to the rear wheel share a gear shifter. In the first configuration, both the pedal and the motor drive the same front gear (hereinafter referred to as the F gear), and the front wheel is not driven.

FIG. 2 shows a second configuration in which a transmission system that transmits torque from a motor to a rear wheel and a transmission system that transmits torque from a pedal to the rear wheel share a gear shifter. In the second configuration, the middle gear of the chain driven by the pedal is also driven by the motor. The front wheel is not driven in this configuration either.

FIG. 3 shows a third configuration in which a transmission system that transmits torque from a motor to a rear wheel and a transmission system that transmits torque from a pedal to the rear wheel share a gear shifter. In the third configuration, the rear wheel is driven by pedal and motor via two chains, respectively. The front wheel is not driven in this configuration either.

FIG. 4 shows a first configuration in which a gear shifter is installed only in the drive route from the pedal. In this configuration, a rear wheel motor drives a real wheel hub (corresponding to the black circle in FIG. 4) to the rear of the gear shifter. In this configuration, driving is conducted with the rear wheel motor further towards the rear wheel than a one way clutch installed in the R gear, and thus, it is possible to use an electromagnetic brake. The front wheel is not driven in this configuration either.

FIG. 5 shows a second configuration in which a gear shifter is installed only in the drive route from the pedal. In this configuration, the motor drives the front wheel. Because there is no one way clutch on the front wheel side, it is possible to use an electromagnetic brake.

In the configurations shown in FIGS. 1 to 3, pedal input torque and assist motor torque from the motor both drive the rear wheel through the gear shifter, and thus, even if the gear shift position, or in other words the gear ratio, changes, the ratio of the torque applied by the pedal to drive the drive wheel (in this case the rear wheel) to the torque applied by the motor to drive the drive wheel, or in other words the assist ratio, does not change. However, because in all of these configurations, the pedal input torque and the assist motor torque work through the R gear, the torque is applied through the one way clutch provided in the R gear. Thus, while torque in the acceleration direction is transmitted to the rear wheel from the motor, torque from the electromagnetic brake, which is in the opposite direction, is not transmitted. In other words, with these configurations, it is not possible to use an electromagnetic brake that includes an electrical power regenerative brake.

On the other hand, in the configurations shown in FIGS. 4 and 5, motor torque is transmitted directly to the rear of the one way clutch installed in the R gear or directly to the front wheel, and thus, it is possible to use an electromagnetic brake that includes an electrical power regenerative brake. However, these configurations have disadvantages as described below.

In the following description, it is assumed that the gear shifter is a three-speed gear shifter, and that the H (high speed) position of the gear shifter has a gear ratio of 4/3, the M (mid speed) position has a gear ratio of 1, and the L (low speed) position has a gear ratio of 3/4.

Specifically, if the same amount of assist motor torque is applied for the same amount of pedal input torque regardless of gear ratio, in the H position, a pedal input torque of 3/4 (the inverse of the gear ratio 4/3) that of the M position is applied to the rear wheel. However, because the assist motor torque is applied directly to the front wheel or the rear wheel without being transmitted through the gear shifter, the amount of assist motor torque remains the same as when the M position is used. Thus, the assist ratio is 1/(3/4) or 4/3 that of when the M position is used. Conversely, in the L position, the assist ratio is 1/(4/3) or 3/4 that of when the M position is used.

Despite the fact that the L position is used during high load situations such as when accelerating from a standstill, climbing hills, or the like, the assist ratio decreases, and when the H position is used, typically during low load situations, the assist ratio is increased.

Also, in some cases, legal regulations or the like stipulate that the maximum assist ratio be a function of the speed of the vehicle. For example, according to Japanese law, there are restrictions on the average assist ratio (the average assist ratio during a ripple fluctuation cycle if the assist ratio has such a ripple fluctuation cycle) such as that shown in FIG. 6. In other words, the maximum average assist ratio needs to follow a curve in which the assist ratio is maintained at 2 up to 10 km/h, and between 10 km/h and 24 km/h inclusive, the assist ratio decreases in a linear manner such that the maximum average assist ratio at 24 km/h is 0.

Also, in such a case, whether the system meets the requirements of the regulations is determined based on the H position in which the assist ratio is greater, and thus, in the M position or the L position, it is not possible to maximize the assist ratio to the fullest within the legal framework.

In this example, the gap between the average assist ratios of the H position and the L position is $(3/4)/(4/3)=9/16$ times. Even if the maximum allowed assist ratio of 2 is used in the H position, the ratio is $9/8$ ($=2*9/16$) in the L position, which means that the average assist ratio is only slightly higher than half of the maximum legal limit.

As schematically shown in FIG. 7, if the average assist ratio in the M position is 3/2, the average assist ratio in the H position is 2, and the average assist ratio in the L position is 9/8. On the other hand, if the average assist ratio in the M position is 1, then the average assist ratio in the H position is 4/3 and the average assist ratio in the L position is 3/4.

Thus, even though a greater assist motor torque is desired when the user sets the gear in the L position, the assist ratio becomes smaller, which means that a problem arises in that the drive power of the motor cannot be effectively used.

A technique has been disclosed in which the ratio of the electric motor to human driving power is small at a high speed setting and large at a low speed setting in order to encourage the rider to shift to a gear appropriate to the running speed, with the view that there is a problem that the motor efficiency is low when a vehicle with a power transmission system of a configuration similar to that shown in FIG. 1 runs at low speeds even in high gear. According to this technique, if the vehicle runs at low speeds in high gear, the assist ratio by the motor becomes small, thus increasing the amount of human driving power required. In other words, the rider is encouraged to shift gears by the discomfort of having to provide more driving power, and when the gear is actually shifted, a large assist ratio is provided in low gear. In that disclosure, the power transmission system of the configuration shown in FIG. 1 is used, and use of such a ratio setting for the power transmission system of the configurations shown in FIGS. 4 and 5 has not been considered.

RELATED ART DOCUMENTS

Patent Documents

Patent Document 1: Japanese Patent No. 3190491

SUMMARY OF THE INVENTION

Therefore, an object of the present invention is to appropriately control the assist ratio of an electric power-assisted vehicle that has a gear shifter and a motor and in which the ratio of the number of rotations in the motor to the number of rotations of the pedal changes depending on changes in the gear ratio.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a motor drive control device according to Embodiment 1 of the present invention is for an electric power-assisted vehicle having a gear shifter and a motor in which a first ratio of a number of drive rotations in the motor to a number of rotations of a pedal changes according to changes in a gear ratio of the gear shifter, the device including: a gear ratio obtaining part that obtains a gear ratio of the gear shifter; and a calculating part that calculates an assist torque, which is a target value for a drive torque of the motor, from a pedal input torque, based on the gear ratio obtained from the gear ratio obtaining part.

In such an electric power-assisted vehicle, the first ratio sometimes changes in the direction opposite to the control direction, and thus, when calculating the assist torque, characteristics of the electric power-assisted vehicle are taken into consideration.

In other words, if the electric power-assisted vehicle is an electric power-assisted vehicle in which if the gear ratio of the gear shifter shifts to a higher speed then the first ratio becomes greater and if the gear ratio shifts to a lower speed then the first ratio becomes less, then the calculating part may calculate the assist torque by factoring in an effect of the gear shifter on the drive torque of the motor driven based on the assist torque, in a reverse direction based on the gear ratio. By doing so, an appropriate motor drive torque can be realized by taking into account effects from the gear shifter in the above-mentioned electric power-assisted vehicle.

The above-mentioned calculating part may set a second ratio of an average assist torque, which represents a one cycle average of the assist torque, to an average pedal input torque, which represents a one cycle average of the pedal input torque, so as to be lower when the gear ratio is set higher compared to when the gear ratio is set lower, and then calculate the assist torque based on the second ratio. By doing so, in a situation in which more assist is desired such as when the gear ratio is set to low gear, it is possible to calculate the assist torque so as to provide more assist.

The above-mentioned calculating part may set the second ratio so as to be proportional to a value resulting from raising the gear ratio by an exponent of −1 or less. By doing so, it is possible to provide an assist appropriate to a situation in which more assist is desired.

Also, the above-mentioned calculating part may limit the second ratio by a separately set upper limit value for the second ratio. This is in order to comply with regulations, legal or otherwise.

In addition, the calculating part may set the second ratio so as to be proportional to a value resulting from raising the gear ratio by an exponent of −1 or less, and limit the second ratio by a product of a third ratio that is inversely proportional to the gear ratio and a limiting value based on the vehicle speed (in other words, the upper limit). By doing so, no matter what the gear ratio is, it is possible to calculate the assist torque using the second ratio up to the upper limit.

Also, the above-mentioned calculating part may change the amount of periodic fluctuation in the total drive power constituted of the wheel drive power by a pedal input torque, which includes periodic torque variation, and a wheel drive power by the assist torque, based on the gear ratio. An appropriate assist can be provided based on the load calculated by the gear ratio, for example.

Also, the calculating part may determine, based on the gear ratio, a coefficient by which to multiply a difference between a smoothed pedal input torque in which the pedal input torque is smoothed, and the pedal input torque, and calculate the assist torque by adding a product of the difference and the coefficient, to a product of the smoothed pedal input torque and the second ratio. By doing so, it is possible to calculate an appropriate assist torque that takes into consideration the ripple in the pedal input torque. In other words, in situations such as climbing hills in which effects from the ripple of the pedal input torque are more pronounced, an effective assist can be determined based on the gear ratio.

The above-mentioned coefficient may be set so as to be smaller when the gear ratio is set higher, compared to when the gear ratio is set lower. By doing so, in a situation in which assist is desired such as climbing hills, a coefficient can be set so as to correspond to the gear ratio.

Also, in a state in which the gear ratio obtaining part cannot obtain the gear ratio (a temporary or transient situation, for example), the upper limit value may be set based on a gear ratio at the highest speed, or the gear ratio when calculating a third ratio may be set based on a gear ratio at the highest speed. By doing so, it is possible to reliably fulfill legal requirements and the like.

In addition, when the gear ratio obtaining part cannot obtain the gear ratio, the above-mentioned calculating part may calculate the assist torque with a prescribed gear ratio at mid speed or a speed lower than mid speed in a situation in which the vehicle is at a standstill or the vehicle speed is lower than a prescribed value, and the pedal input torque is 0 or has started to rise from a small value. This is because in such a situation, a relatively large amount of assist is desired.

Also, in a state in which the gear ratio obtaining part cannot obtain the gear ratio, the above-mentioned calculating part may use the gear ratio obtained immediately prior to that state. If the vehicle is running, for example, this allows assist to be provided without any unnatural feeling on the part of the rider.

A motor drive control device according to Embodiment 2 of the present invention is for an electric power-assisted vehicle having a gear shifter and a motor in which a first ratio of a number of drive rotations in the motor to a number of rotations of a pedal changes according to changes in a gear ratio of the gear shifter, the device including: a controller that assumes a gear ratio lower than mid speed when conditions including that a prescribed amount of time has not passed since a pedal input torque has started increasing from 0 or a small value are satisfied, and assumes a gear ratio equal to or greater than mid speed when the conditions are no longer satisfied; and a calculating part that calculates an assist torque, which is a target value for a drive torque of the motor from the pedal input torque, based on the assumed gear ratio.

By doing so, even if the gear ratio of the gear shifter cannot be obtained, it is possible to provide an appropriate assist for the gear ratio. In particular, if the above-mentioned conditions are satisfied, then the assist is desired.

In such an electric power-assisted vehicle, the first ratio sometimes changes in the direction opposite to the control direction, and thus, when calculating the assist torque, characteristics of such a bicycle are taken into consideration when conducting control.

If the above-mentioned electric power-assisted vehicle is a bicycle in which, if the gear ratio of the gear shifter shifts to a higher speed, then a first ratio becomes higher, and if the gear ratio shifts to a lower speed, then the first ratio becomes lower, the controller may output a correction coefficient, which is set factoring in an effect of the gear shifter on a drive torque of the motor driven based on the assist torque, in a reverse direction to the set gear ratio, and the calculating part may correct, based on the correction coefficient, a second ratio of an average assist torque, which represents a one cycle average of the assist torque, to an average pedal input torque, which represents a one cycle average of the pedal input torque. By doing so, an appropriate motor drive torque can be realized by taking into account effects from the gear shifter in the above-mentioned bicycle.

In addition, the above-mentioned calculating part may set a second ratio of an average assist torque, which represents a one cycle average of the assist torque, to an average pedal input torque, which represents a one cycle average of the pedal input torque, so as to be lower when the gear ratio is set higher compared to when the gear ratio is set lower, and calculate the assist torque based on the second ratio. By doing so, it is possible to calculate the assist torque such that more assist is given in a situation in which more assist is desired, such as when in low gear.

The above-mentioned conditions sometimes further include a condition that a vehicle speed is less than a prescribed value. This is because the assist is desired even in such a case.

The calculating part may limit the second ratio of an average assist torque, which represents a one cycle average of the assist torque, to an average pedal input torque, which represents a one cycle average of the pedal input torque, by an upper limit value set based on the highest speed gear ratio. This is because the gear ratio is an assumed gear ratio, and a limit needs to be set on the second ratio from a safety perspective. Such a process can be accomplished by writing a program to be executed by a microprocessor, and this program is stored in a storage medium or a storage device that is readable by a computer such as a floppy disk, an optical disc such as a CD-ROM, a magneto-optical disc, a semiconductor memory (such as ROM), a hard drive, or the like. Data to be processed is temporarily stored in a storage device such as a RAM (random access memory).

According to one aspect, the motor drive of a bicycle that has a gear shifter and a motor and in which the ratio of the pedal input torque to the motor drive torque changes based on changes in gear ratio in the gear shifter can be appropriately controlled.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Embodiment 1

Figure 5:
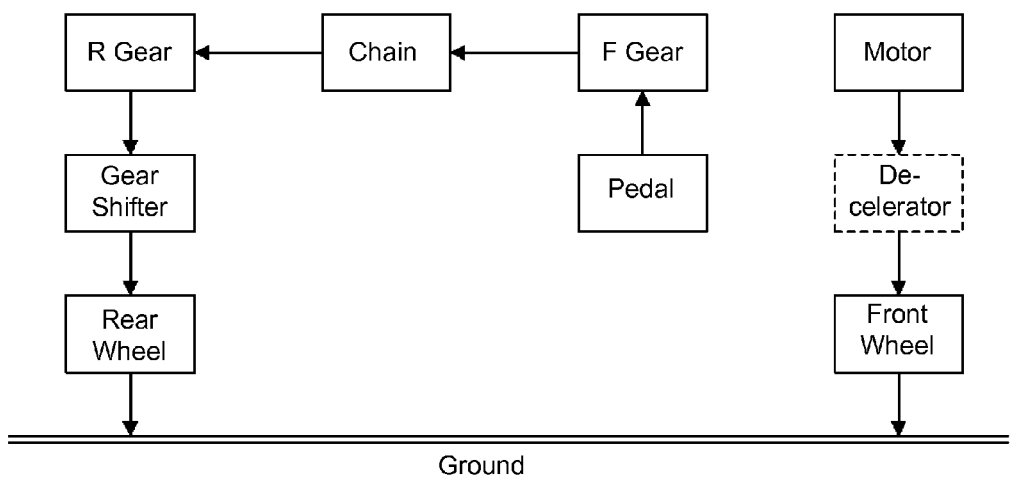
FIG. 5 is a drawing for describing one example of a power transmission system.
Figure 6:
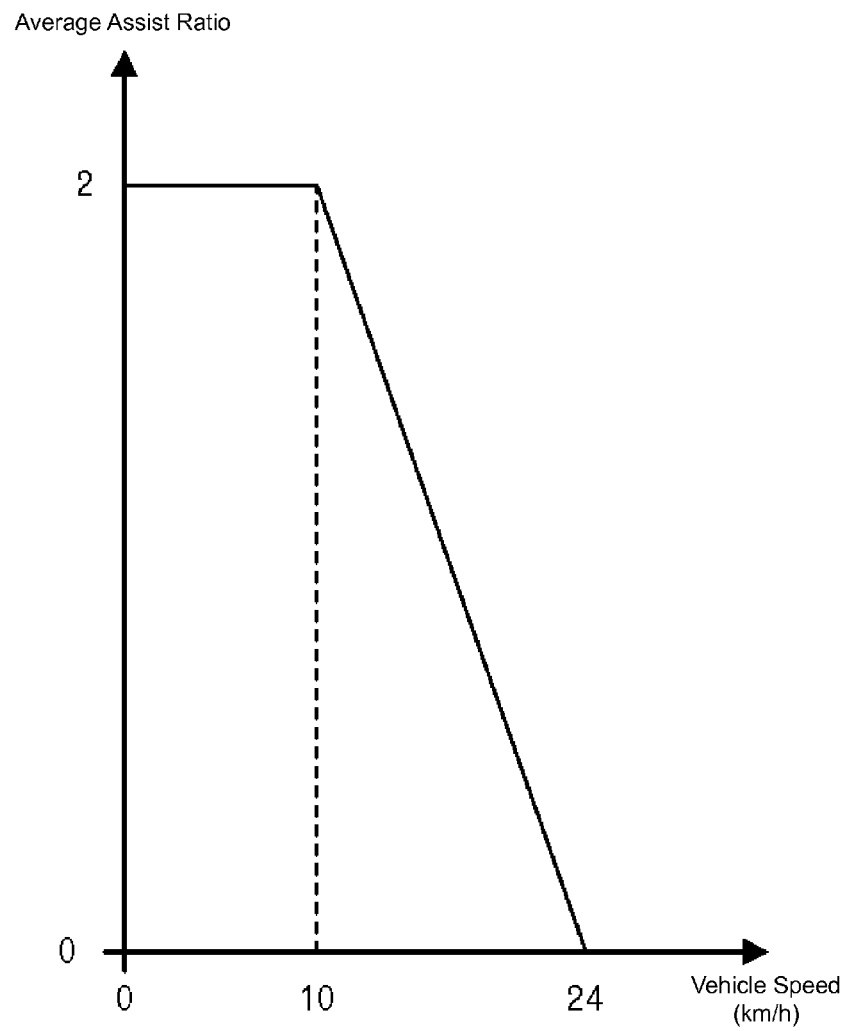
FIG. 6 is a drawing for describing a conventional technique.
Figure 7:
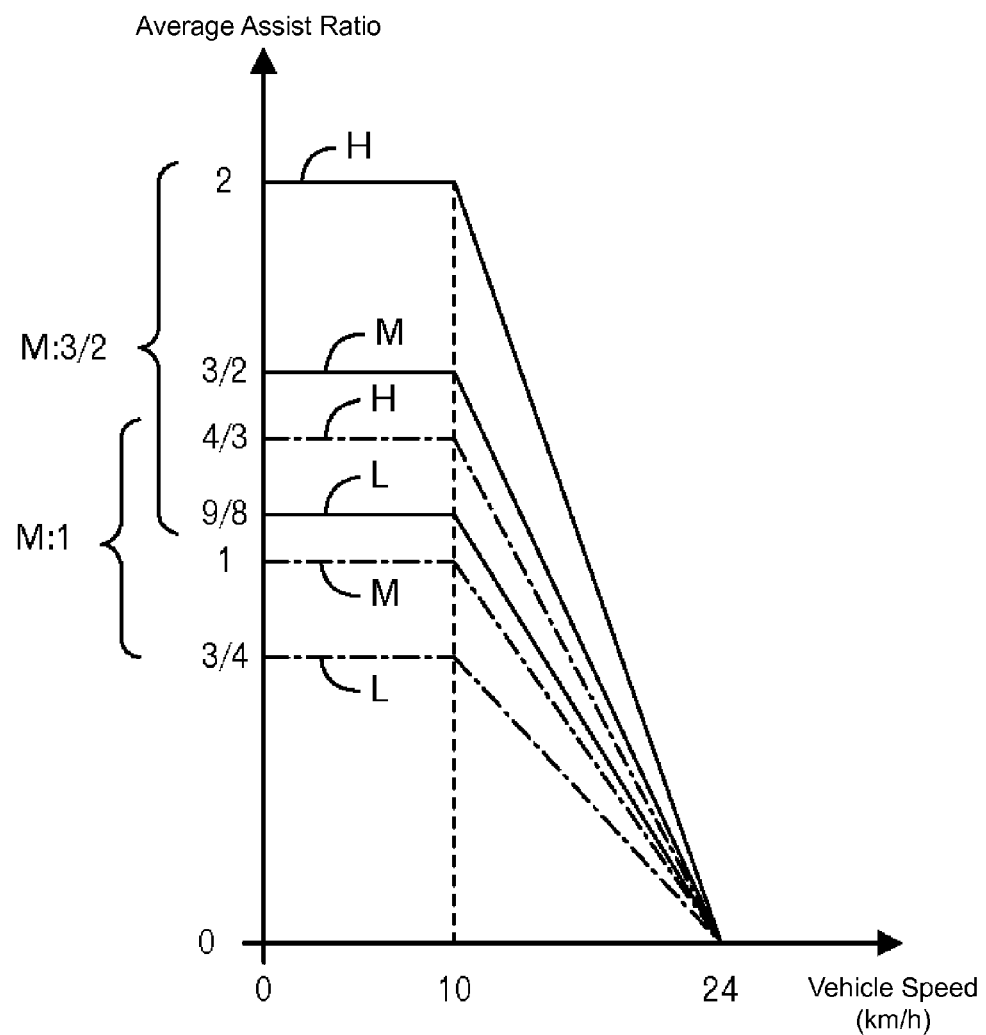
FIG. 7 is a drawing for describing a conventional technique.
Figure 8:
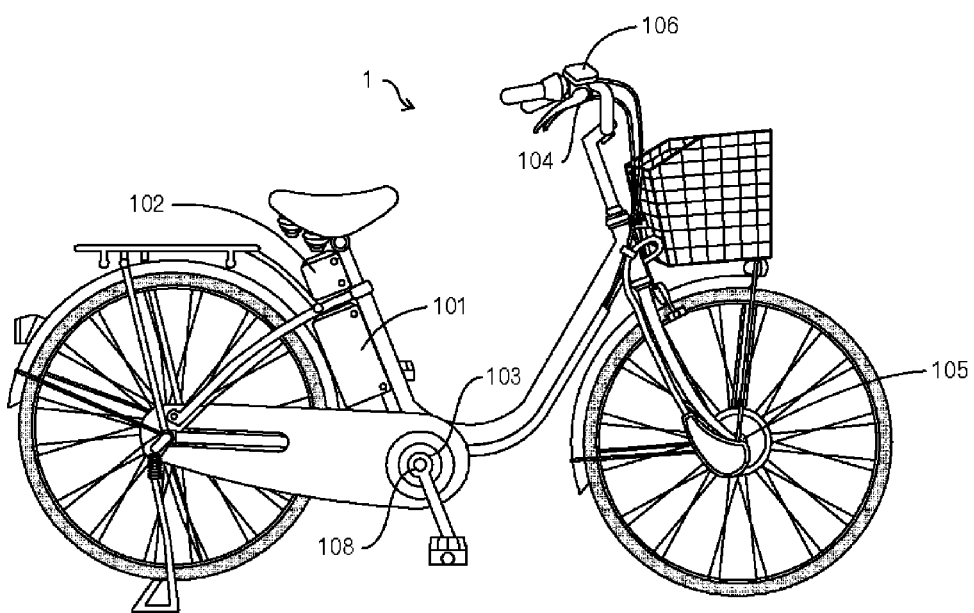
FIG. 8 is a drawing that shows one example of an electric power-assisted vehicle with a motor.

FIG. 8 is an external view that shows an example of a bicycle with a motor according to the present embodiment. This bicycle 1 with a motor has a power transmission system of a configuration shown in FIG. 5, for example, and is a general rear wheel drive in which a crankshaft and a rear wheel are connected via chain. The bicycle 1 with a motor is an electric power-assisted vehicle that has a gear shifter and a motor and in which the ratio of the pedal input torque to the drive torque from the motor changes depending on changes in gear ratio in the gear shifter. Also, the bicycle 1 is an electric power-assisted vehicle that has a gear shifter and a motor and in which a ratio of the motor drive rotations to the pedal drive rotations changes based on changes in the gear ratio in the gear shifter.

The bicycle 1 with a motor has a motor drive device. The motor drive device has a secondary battery 101, a motor drive controller 102, a torque sensor 103, a brake sensor 104, a motor 105, a control panel 106, and a pedal rotation sensor 108.

The secondary battery 101 is a lithium ion secondary battery in which the maximum supply voltage (voltage when fully charged) is 24V, for example, but the secondary battery 101 may be another type of battery such as a lithium ion polymer secondary battery or a nickel-metal hydride rechargeable battery.

The torque sensor 103 is provided in a wheel installed on the crankshaft, detects force on the pedal by a rider, and outputs the result thereof to the motor drive controller 102. Similarly, the pedal rotation sensor 108 is provided in a wheel installed on the crankshaft as in the torque sensor 103, and outputs a signal based on the rotations to the motor drive controller 102.

The brake sensor 104 is constituted of a magnet and a known reed switch. The magnet is fixed to a brake wire connected to a brake lever in a case in which the brake lever is fixed and through which the brake wire passes. The brake lever is designed so as to switch the reed switch on when gripped by a hand. Also, the reed switch is fixed inside the case. A conduction signal from the reed switch is transmitted to the motor drive controller 102.

The motor 105 is a known three phase brushless motor, for example, and is installed on a front wheel of the bicycle 1 with a motor, for example. The motor 105 rotates the front wheel and a rotor is connected to the front wheel so as to rotate when the front wheel rotates. In addition, the motor 105 is provided with a rotation sensor such as a Hall element and outputs rotation information from the rotor (in other words a Hall signal) to the motor drive controller 102.

The control panel 106 receives command input from the user on whether or not to provide assist, for example, and outputs the command input to the motor drive controller 102. The control panel 106 receives settings input on the assist ratio (the assist ratio at the M position; also referred to as a desired assist ratio) from the user and outputs the settings input to the motor drive controller 102. In some cases, a signal representing the gear ratio is also outputted to the motor drive controller 102 from the gear shifter or the like.

Figure 9:
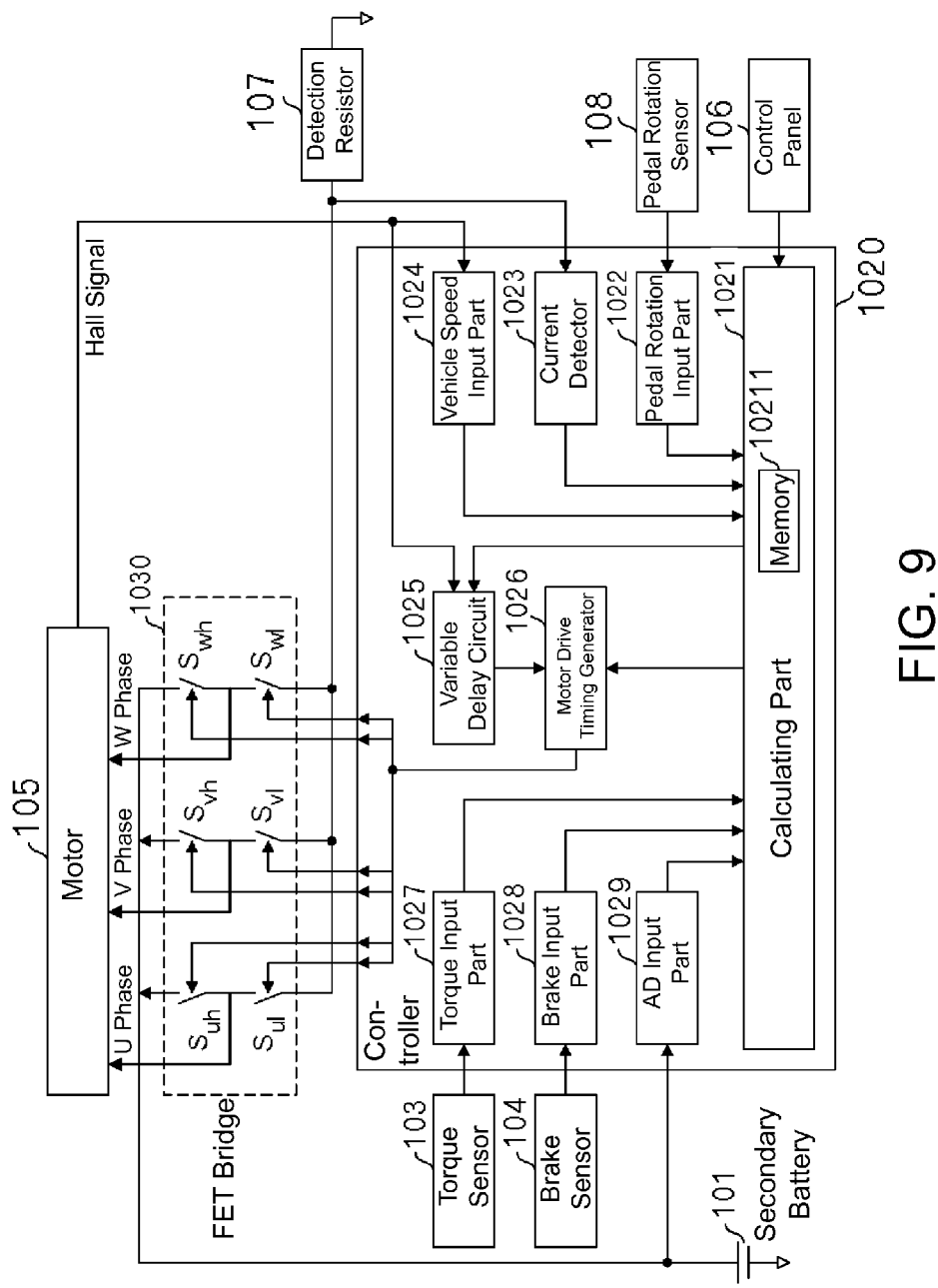
FIG. 9 is a block diagram of functions relating to a motor drive controller.

A configuration of the motor drive controller 102 of the bicycle 1 with a motor is shown in FIG. 9. The motor drive controller 102 has a controller 1020 and an FET (field effect transistor) bridge 1030. The FET bridge 1030 includes a high side FET ($S_{uh}$) and a low side FET ($S_{ul}$) that conduct U-phase switching for the motor 105, a high side FET ($S_{vh}$) and a low side FET ($S_{vl}$) that conduct V-phase switching for the motor 105, and a high side FET ($S_{wh}$) and a low side FET ($S_{wl}$) that conduct W-phase switching for the motor 105. The FET bridge 1030 constitutes a portion of the complementary switching amp.

Also, the controller 1020 has a calculating part 1021, a pedal rotation input part 1022, a current detector 1023, a vehicle speed input part 1024, a variable delay circuit 1025, a motor drive timing generator 1026, a torque input part 1027, a brake input part 1028, and an AD input part 1029.

The calculating part 1021 conducts calculation to be mentioned below based on input from the control panel 106 (on/off and operating mode (such as the assist ratio), for example), input from the pedal rotation input part 1022, input from the current detector 1023, input from the vehicle speed input part 1024, input from the torque input part 1027, input from the brake input part 1028, and input from the AD input part 1029. The calculating part 1021 then outputs the calculation to the motor drive timing generator 1026 and the variable delay circuit 1025. The calculating part 1021 has a memory 10211, and the memory 10211 stores various types of data used for calculation, data during calculation, and the like. In addition, the calculating part 1021 is sometimes executed due to a program being executed by a processor, and in this case, the program is sometimes stored in the memory 10211.

The pedal rotation input part 1022 digitizes input from the pedal rotation sensor 108 and outputs it to the calculating part 1021. The current detector 1023 digitizes a voltage value corresponding to a current using a detection resistor 107 that detects a current flowing to the FETs in the FET bridge 1030 and outputs the voltage value to the calculating part 1021. The vehicle speed input part 1024 calculates the current speed of the vehicle and the rotational cycle of the rear wheel from a Hall signal outputted from the motor 105, and outputs these data to the calculating part 1021. The torque input part 1027 digitizes a signal from the torque sensor 103 corresponding to a force applied to the pedal and outputs the signal to the calculating part 1021. The brake input part 1028 digitizes a signal from the brake sensor 104 corresponding to the brake force and outputs the signal to the calculating part 1021. The AD (analog-digital) input part 1029 digitizes output voltage from the secondary battery 101 and outputs it to the calculating part 1021. The memory 10211 is sometimes provided separately from the calculating part 1021.

The calculating part 1021 outputs an advance angle value as the calculation result to the variable delay circuit 1025. The variable delay circuit 1025 adjusts the phase of the Hall signal based on the advance angle value received from the calculating part 1021 and outputs it to the motor drive timing generator 1026. The calculating part 1021 outputs a PWM (pulse width modulation) code, which corresponds to the duty cycle of the PWM, for example, as the calculation result to the motor drive timing generator 1026. The motor drive timing generator 1026 generates a switching signal to each FET included in the FET bridge 1030 based on the Hall signal after adjustment from the variable delay circuit 1025 and the PWM code from the calculating part 1021, and outputs the switching signal.

Figure 10:
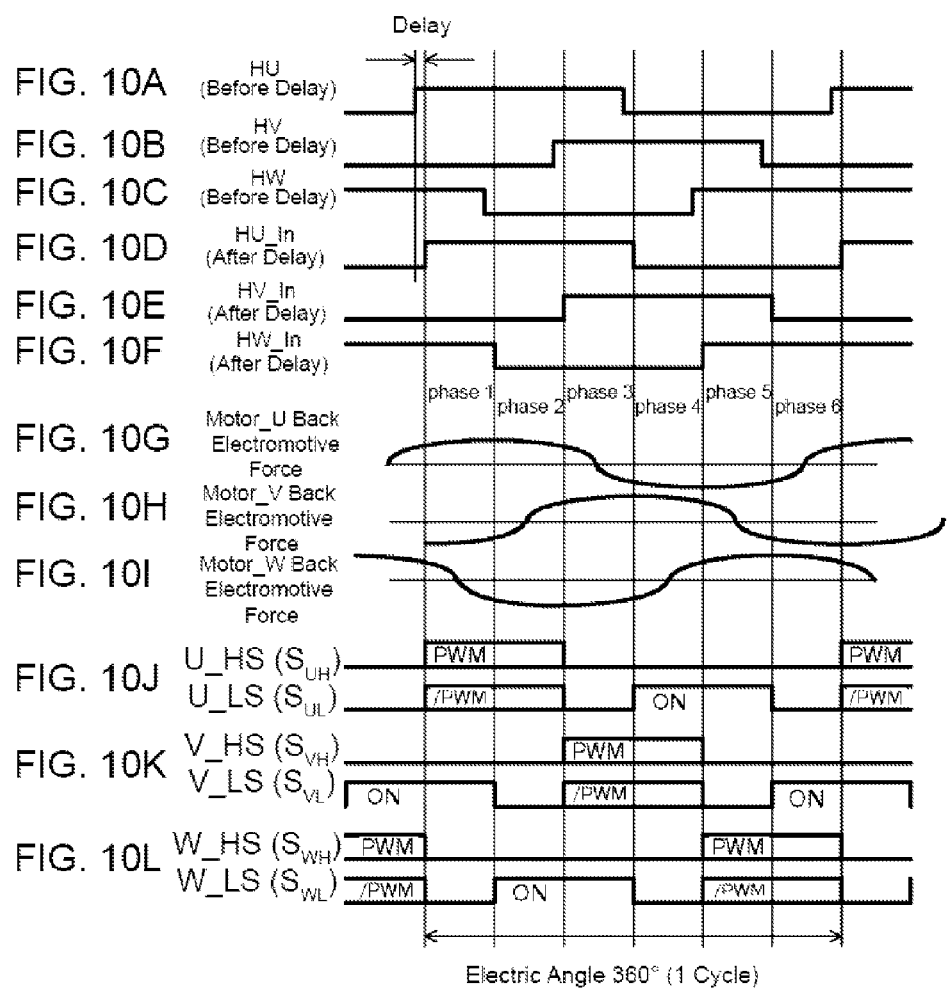
FIGS. 10A to 10L are waveform charts for describing basic operations for driving a motor.

FIGS. 10A to 10L show basic operations for driving the motor based on the configuration shown in FIG. 9. FIG. 10A shows a U-phase Hall signal HU outputted from the motor 105, FIG. 10B shows a V-phase Hall signal HV outputted from the motor 105, and FIG. 10C shows a W-phase Hall signal HW outputted from the motor 105. As described, the Hall signal represents the rotational phase of the motor. Although the rotational phase is not obtained as a continuous value here, other sensors and the like may obtain a continuous value therefor. As described below, in the present embodiment, the Hall element of the motor 105 is provided so as to output the Hall signal at a somewhat advanced phase as shown in FIG. 10, and is made so as to be able to be adjusted by the variable delay circuit 1025. Therefore, a U-phase Hall signal HU_In after adjustment as shown in FIG. 10D is outputted from the variable delay circuit 1025 to the motor drive timing generator 1026, a V-phase Hall signal HV_In after adjustment as shown in FIG. 10E is outputted from the variable delay circuit 1025 to the motor drive timing generator 1026, and a W-phase Hall signal HW_In after adjustment as shown in FIG. 10F is outputted from the variable delay circuit 1025 to the motor drive timing generator 1026.

One period of the Hall signal has 360° of electrical angle, which is divided into six phases. Also, as shown in FIGS. 10G to 10I, back electromotive force voltages include a Motor_U back electromotive force that is generated in a U-phase terminal, a Motor_V back electromotive force that is generated in a V-phase terminal, and a Motor_W back electromotive force that is generated in a W-phase terminal. In order to drive the motor 105 by applying drive voltages at the same phases as the motor back electromotive force voltages, a switching signal such as that shown in FIGS. 10J to 10L is outputted to a gate of each FET of the FET bridge 1030. U_HS of FIG. 10J represents a U-phase high side FET ($S_{uh}$) gate signal, and U_LS represents a U-phase low side FET ($S_{ul}$) gate signal. PWM and "/PWM" represent an on/off period in the duty cycle corresponding to the PWM code, which is the calculation result of the calculating part 1021, and because it is complementary, if PWM is on then /PWM is off, and if PWM is off, then /PWM is on. The low side FET ($S_{ul}$) stays on throughout the ON period. V_HS of FIG. 10K represents a V-phase high side FET ($S_{vh}$) gate signal, and V_LS represents a V-phase low side FET ($S_{vl}$) gate signal. The reference characters are the same as those of FIG. 10J. W_HS in FIG. 10L represents a W-phase high side FET ($S_{wh}$) gate signal, and W_LS represents a W-phase low side FET ($S_{wl}$) gate signal. The reference characters are the same as those of FIG. 10J.

In this way, the U-phase FETs ($S_{uh}$ and $S_{ul}$) conduct PWM switching at phases 1 and 2, and the U-phase low side FET ($S_{ul}$) is turned on in phases 4 and 5. The V-phase FETs ($S_{vh}$ and $S_{vl}$) conduct PWM switching at phases 3 and 4, and the V-phase low side FET ($S_{vl}$) is turned on in phases 6 and 1. The W-phase FETs ($S_{wh}$ and $S_{wl}$) conduct PWM switching in phases 5 and 6 and the W-phase low side FET ($S_{wl}$) is turned on in phases 2 and 3.

If such signals are outputted and the duty cycle is appropriately controlled, the motor 105 can be driven with a desired torque.

Figure 11:
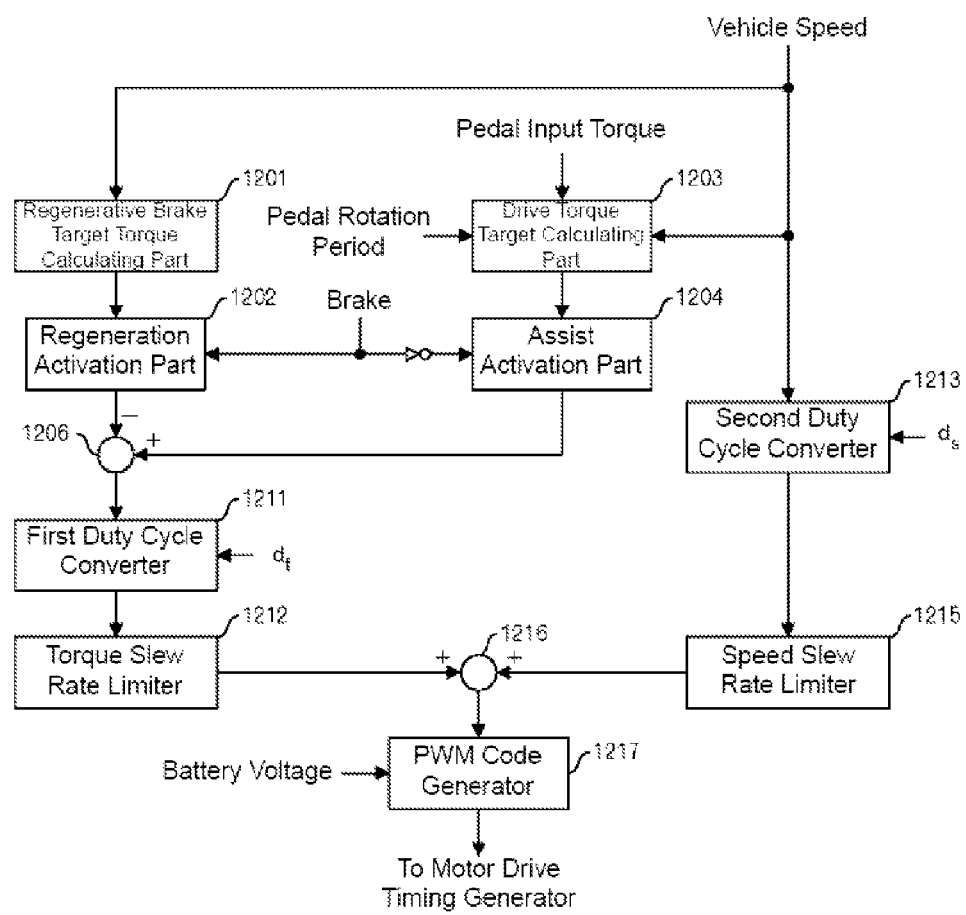
FIG. 11 is a block diagram of functions of the calculating part.

Next, a block diagram of the functions of the calculating part 1021 is shown in FIG. 11. The calculating part 1021 has a regenerative brake target torque calculating part 1201, a regeneration activation part 1202, a drive torque target calculating part 1203, an assist activation part 1204, an adder 1206, a first duty cycle converter 1211, a torque slew rate limiter 1212, a second duty cycle converter 1213, a speed slew rate limiter 1215, an adder 1216, and a PWM code generator 1217.

The vehicle speed value from the vehicle speed input part 1024 and the pedal torque value from the torque input part 1027 is inputted into the drive torque target calculating part 1203 and an assist torque value is calculated. Also, the pedal rotation period from the pedal rotation input part 1022 is also inputted into the drive torque target calculating part 1203 and is used when calculating the assist torque value. The calculations performed by the drive torque target calculating part 1203 will be described in detail below.

Also, the regenerative brake target torque calculating part 1201 calculates a regenerative brake target torque value according to a curve set in advance, for example, based on the vehicle speed value from the vehicle speed input part 1024. The curve represents a relation in which the curve has reversed polarity to the vehicle speed value and is half or less ("half or less" sometimes includes cases in which the curve exceeds "half" by a few percentage points, for example) of the absolute value of the vehicle speed. By doing so, no matter what the speed, regeneration can occur at a certain efficiency. This process is not the main point of the present embodiment and therefore will not be described any further.

In the present embodiment, if an input signal that signifies that the brake is active is inputted from the brake input part 1028, the regeneration activation part 1202 outputs a regenerative brake target torque value from the regenerative brake target torque calculating part 1201 to the adder 1206. In other cases, the regeneration activation part 1202 outputs 0. On the other hand, if an input signal signifying that the brake is not active is inputted from the brake input part 1028, then the assist activation part 1204 outputs an assist torque value from the drive torque target calculating part 1203. In other cases, the assist activation part 1204 outputs 0.

The adder 1206 reverses the polarity of the regenerative brake target torque value from the regeneration activation part 1202 and then outputs it, but outputs the assist torque value from the assist activation part 1204 as is. In order to simplify the description, the assist torque value and the regenerative brake target torque value will be referred to as a target torque value below.

The first duty cycle converter 1211 calculates the torque duty code by multiplying the target torque value from the adder 1206 by a conversion coefficient $d_t$, and outputs the torque duty code to the torque slew rate limiter 1212. The torque slew rate limiter 1212 conducts a well-known slew rate limiting process on the output from the first duty cycle converter 1211, and outputs the result of the slew rate limiting process to the adder 1216.

The second duty cycle converter 1213 calculates the vehicle speed duty code by multiplying the vehicle speed value by the conversion coefficient $d_s$ and outputs the vehicle speed duty code to the speed slew rate limiter 1215. The speed slew rate limiter 1215 conducts a well-known slew rate limiting process on the output from the second duty cycle converter 1213, and outputs the result of the slew rate limiting process to the adder 1216.

The adder 1216 calculates a duty code by adding the torque duty code from the torque slew rate limiter 1212 and the vehicle speed duty code from the speed slew rate limiter 1215, and outputs the duty code to the PWM code generator 1217. The PWM code generator 1217 multiplies the duty code by a battery voltage/reference voltage (24V, for example) from the AD input part 1029 and generates a PWM code. The PWM code is outputted to the motor drive timing generator 1026.

Figure 12:
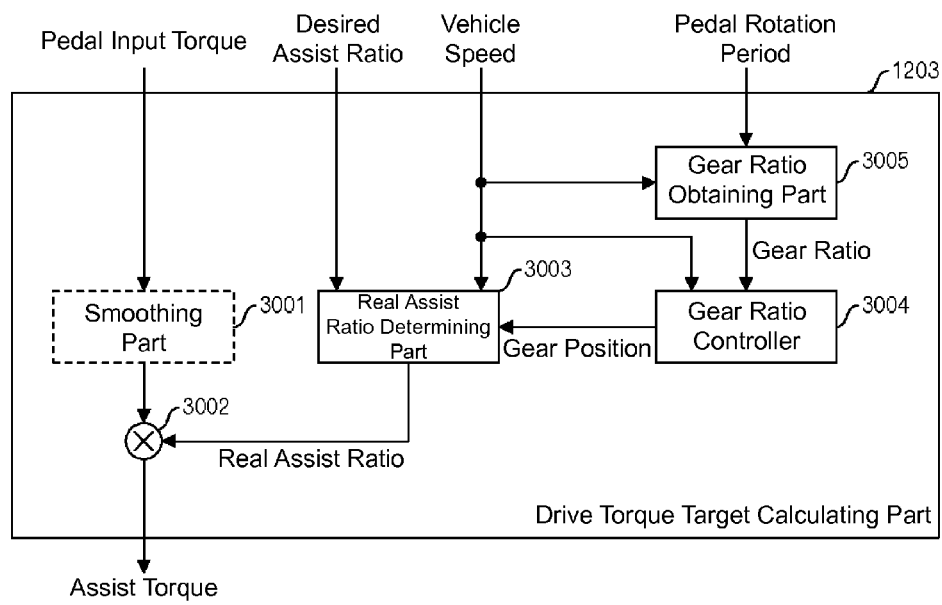
FIG. 12 is a block diagram of functions of a drive torque target calculating part according to Embodiment 1.

The drive torque target calculating part 1203 according to the present embodiment has functions as shown in FIG. 12, for example. In other words, the drive torque target calculating part 1203 has a multiplier 3002, a gear ratio obtaining part 3005, a real assist ratio determining part 3003, and a gear ratio controller 3004. The drive torque target calculating part 1203 may further have a smoothing part 3001 that smoothes the pedal input torque.

The gear ratio obtaining part 3005 calculates the gear ratio by dividing the pedal rotation period by the rear wheel rotation period and outputs the gear ratio to the gear ratio controller 3004. If directly receiving a signal representing a gear ratio from a gear shifter or the like, the gear ratio is outputted to the gear ratio controller 3004. The gear ratio controller 3004 outputs the gear position (H, M, or L, for example) for assist ratio correction to the real assist ratio determining part 3003 based on the gear ratio from the gear ratio obtaining part 3005. In another embodiment, the gear ratio controller 3004 may output the gear position using the vehicle speed. In yet another embodiment, the gear ratio controller 3004 may also output the gear position for upper limit correction, separately from the gear position for assist ratio correction.

The real assist ratio determining part 3003 determines the real assist ratio from the desired assist ratio set by the rider, the vehicle speed, and the gear position, and outputs it to the multiplier 3002. The multiplier 3002 calculates the assist torque value by multiplying the real assist ratio and either a smoothed pedal input torque if a smoothing part 3001 is provided or the pedal input torque itself if the smoothing part 3001 is not provided, and outputs the assist torque value.

Figure 13:
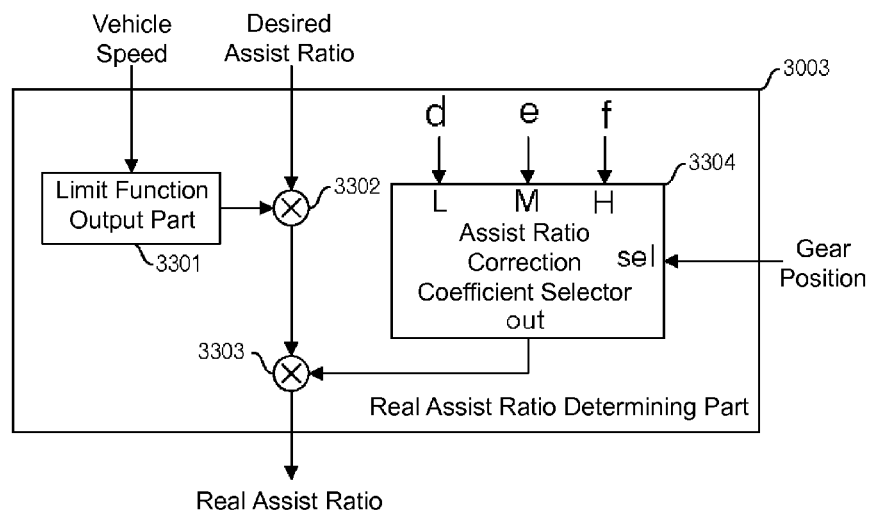
FIG. 13 is a block diagram of functions of a real assist ratio determining part according to Embodiment 1.

The real assist ratio determining part 3003 according to the present embodiment has functions as shown in FIG. 13, for example. In the present embodiment and in other embodiments, it is assumed that the gear shifter is a three-speed gear shifter, and that the H (high speed) position of the gear shifter has a gear ratio of 4/3, the M (mid speed) position has a gear ratio of 1, and the L (low speed) position has a gear ratio of 3/4.

Figure 14:
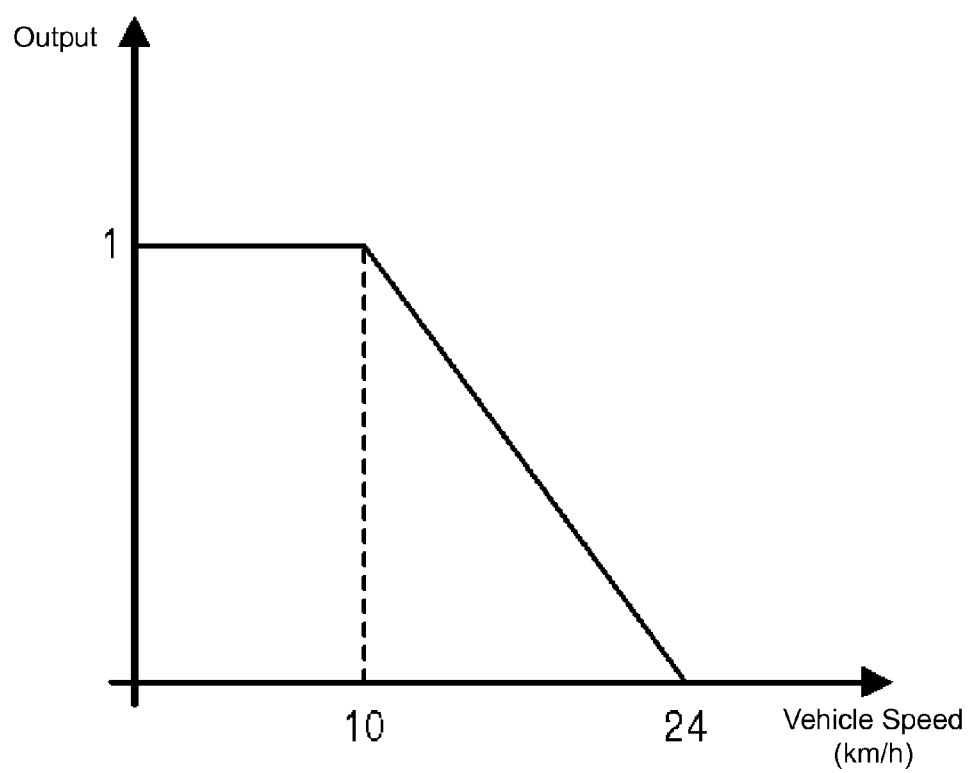
FIG. 14 is a drawing that shows one example of a derating function according to Embodiment 1.

The real assist ratio determining part 3003 has a limit function output part 3301, multipliers 3302 and 3303, and an assist ratio correction coefficient selector 3304. The limit function output part 3301 outputs a derating function value corresponding to legal regulations shown in FIG. 14, for example, based on the vehicle speed. In the example in FIG. 14, a curve in which "1" is outputted up to a vehicle speed of 10 km/h, and for speeds greater than that, the function value decreases linearly until it reaches 0 at 24 km/h is used.

Figure 4:
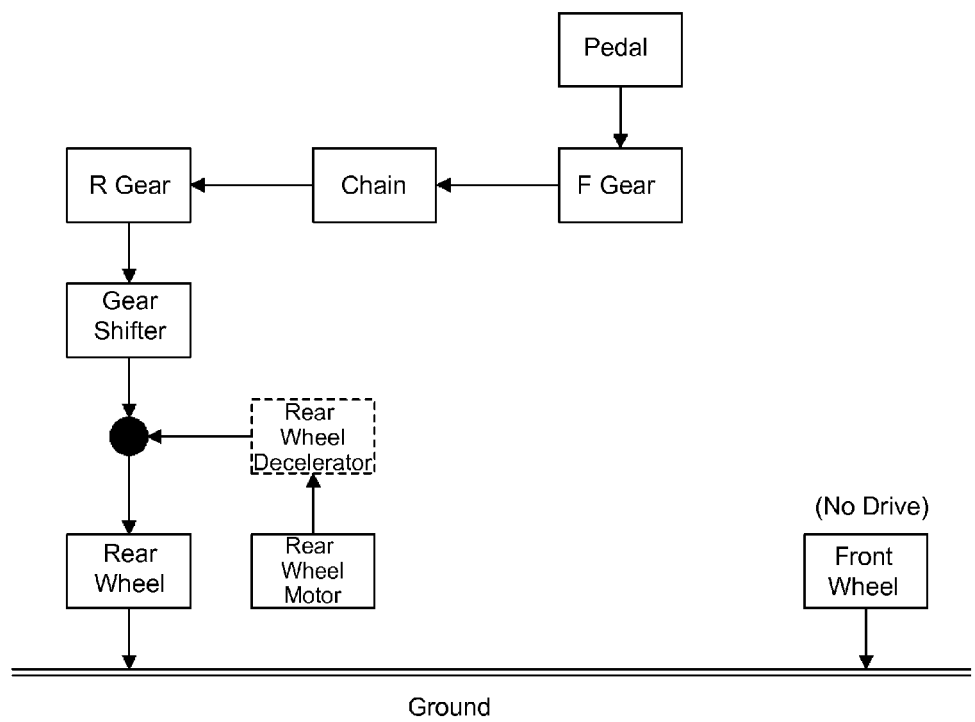
FIG. 4 is a drawing for describing one example of a power transmission system.

The assist ratio correction coefficient selector 3304 outputs a correction coefficient according to a gear position when the gear position for assist ratio correction is inputted. In the present embodiment, a correction coefficient "d" is outputted when in the L position, a correction coefficient "e" is outputted when in the M position, and a correction coefficient "f" is outputted when in the H position. More specifically, d=4/3, e=1, and f=3/4. These values are inversely proportional to the gear ratio. As will be described below, in the bicycle 1 with a motor, which uses a power transmission system of a configuration such as that of FIGS. 4 and 5, a coefficient value is set in order to cancel the effects of the gear shifter on the assist motor torque and the assist ratio.

Also, the multiplier 3302 outputs the product of the desired assist ratio and the output of the limit function output part 3301 to the multiplier 3303. The multiplier 3303 outputs the product of the output from the multiplier 3302 and the assist ratio correction coefficient, and outputs it as the real assist ratio.

Figure 15:
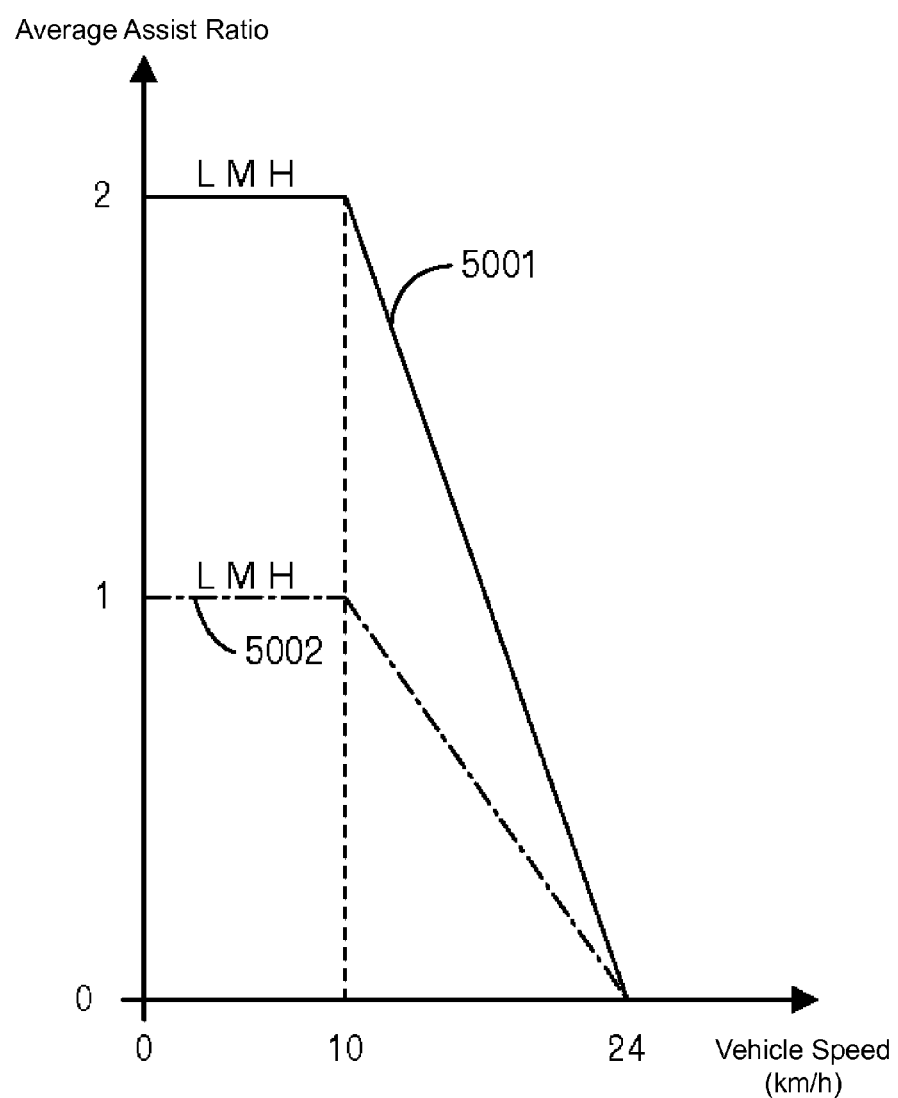
FIG. 15 is a drawing that shows an average assist ratio obtained by calculations according to Embodiment 1.

In this case, average assist ratios such as those shown in FIG. 15 can be obtained. For example, if the desired assist ratio=1 where the vehicle speed is 10 km/h, then if the gear is in the H position, then the real assist ratio is 1×3/4=3/4. However, as an effect of the gear ratio, the real assist ratio×the gear ratio is the average assist ratio, and thus becomes 3/4×4/3=1. Similarly, when in the L position, the real assist ratio is 1×4/3=4/3. However, as an effect of the gear ratio, the real assist ratio×the gear ratio is the average assist ratio, and thus becomes 4/3×3/4=1. In this way, the average assist ratio has a constant value of 1 regardless of the gear position. When taking into consideration the vehicle speed, a curve 5002 in FIG. 15 can be generated from the output from the limit function output part 3301. If the desired assist ratio=2, then the average assist ratio is a constant value of 2. When taking into consideration the vehicle speed, a curve 5001 in FIG. 15 can be generated from the output from the limit function output part 3301.

By calculating the assist ratio in this way, the average assist ratio can be made constant regardless of the gear position, and the load on the rider can be effectively reduced.

Embodiment 2

A configuration of the present embodiment is basically similar to Embodiment 1. However, the values of the correction coefficients "d", "e", and "f" inputted into the assist ratio correction coefficient selector 3304 of the real assist ratio determining part 3003 are different.

In the present embodiment, the correction coefficient "d" for the L position is 8/5, the correction coefficient "e" for the M position is 1, and the correction coefficient "f" for the H position is 5/8, for example. In Embodiment 1, a value that is inversely proportional to the gear ratio was used, but in the present embodiment, an exponent of less than −1 is set, and a value that is proportional to a gear ratio raised to the power of this exponent is used as an example.

Figure 16:
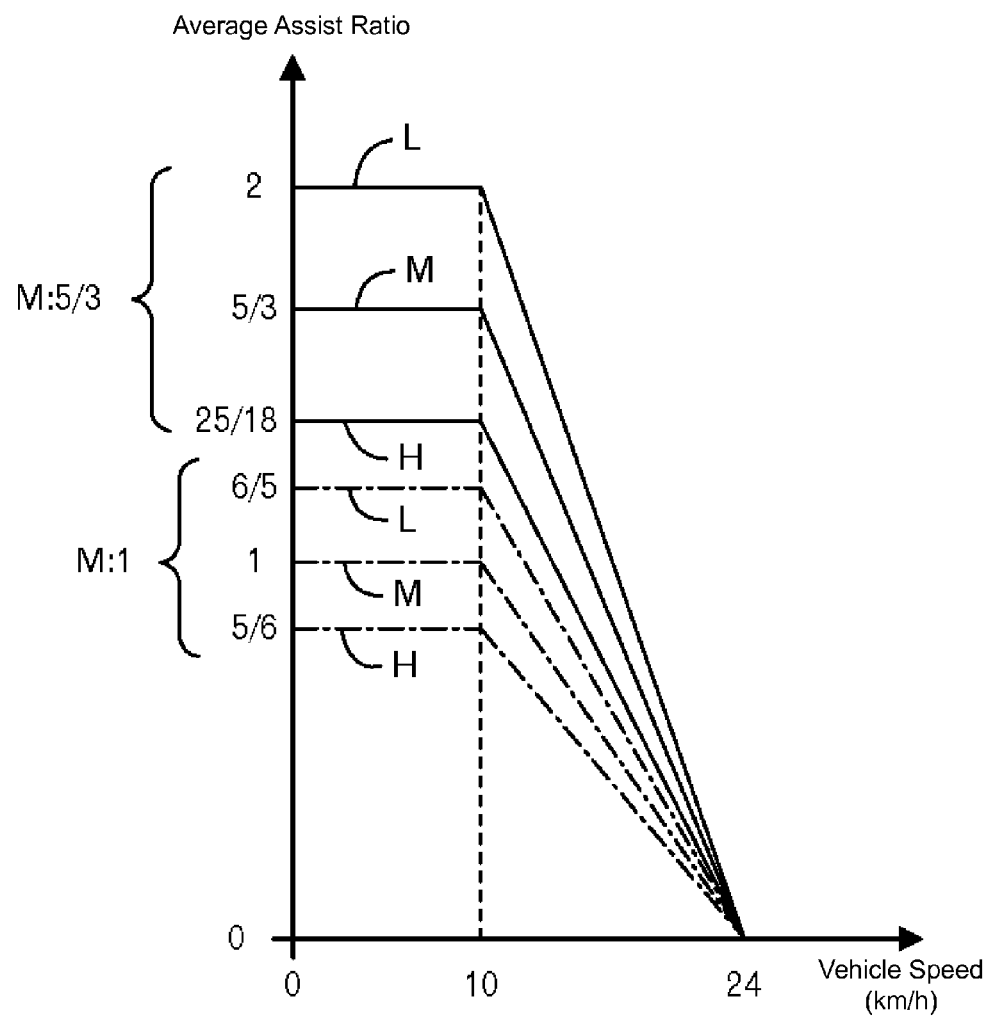
FIG. 16 is a drawing that shows an average assist ratio obtained by calculations according to Embodiment 2.

In such a case, average assist ratios as shown in M:1 (average assist ratio=1 in M position) in FIG. 16 can be obtained. For example, if the desired assist ratio=1 where the vehicle speed is 10 km/h, then if the gear is in the H position, then the real assist ratio is 1×5/8=5/8. However, as an effect of the gear ratio, the real assist ratio×the gear ratio is the average assist ratio, and thus the average assist ratio becomes 5/8×4/3=5/6. Similarly, when in the L position, the real assist ratio is 1×8/5=8/5. However, as an effect of the gear ratio, the real assist ratio×the gear ratio is the average assist ratio, and thus the average assist ratio becomes 8/5×3/4=6/5. In this way, the L position is set so as to have a higher assist ratio than the H position.

Similarly, if the desired assist ratio=5/3, then average assist ratios as shown in M=5/3 (average assist ratio=3/2 in M position) in FIG. 16 can be obtained. In this case, the L position also is set so as to have a higher assist ratio than the H position.

By doing so, it is possible to provide a larger amount of assist from the motor in the L position where it is assumed that the load is high.

Embodiment 3

Figure 17:
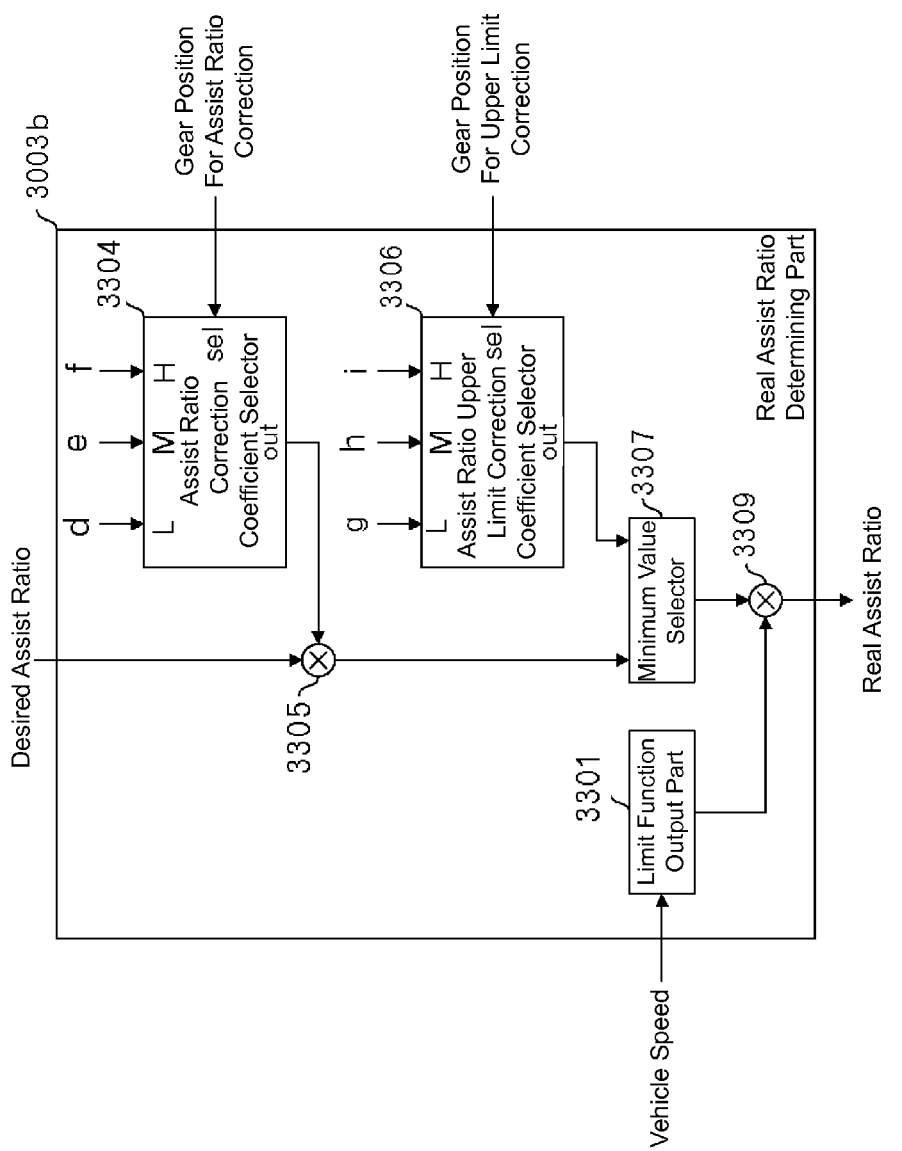
FIG. 17 is a block diagram of functions of a real assist ratio determining part according to Embodiment 3.

In the present embodiment, a real assist ratio determining part 3003b as shown in FIG. 17 is used instead of the real assist ratio determining part 3003 shown in FIG. 13. The same reference characters are assigned for the same functions.

The real assist ratio determining part 3003b according to the present embodiment has a limit function output part 3301, an assist ratio correction coefficient selector 3304, a multiplier 3305, an assist ratio upper limit correction coefficient selector 3306, a minimum value selector 3307, and a multiplier 3309.

In the present embodiment, the correction coefficients "d", "e", and "f" inputted into the assist ratio correction coefficient selector 3304 are the same as those of Embodiment 2, and are 8/5, 1, and 5/8, respectively.

The assist ratio upper limit correction coefficient selector 3306 selects an L position assist ratio upper limit correction coefficient "g", an M position correction coefficient "h", or an H position correction coefficient "i" based on the upper limit correction gear position, and outputs it. In the present embodiment, the correction coefficient g=4/3, the correction coefficient h=1, and the correction coefficient i=3/4. In this way, the value is set so as to be inversely proportional to the gear ratio. In the present embodiment, the upper limit correction gear position and the assist ratio correction gear position are the same.

The multiplier 3305 outputs the product of the desired assist ratio and the output from the assist ratio correction coefficient selector 3304. The minimum value selector 3307 outputs the smaller of the output from the multiplier 3305 and the output from the assist ratio upper limit correction coefficient selector 3306. In addition, the multiplier 3309 outputs the product of the output from the limit function output part 3301 and the output from the minimum value selector 3307, as the real assist ratio.

Figure 18:
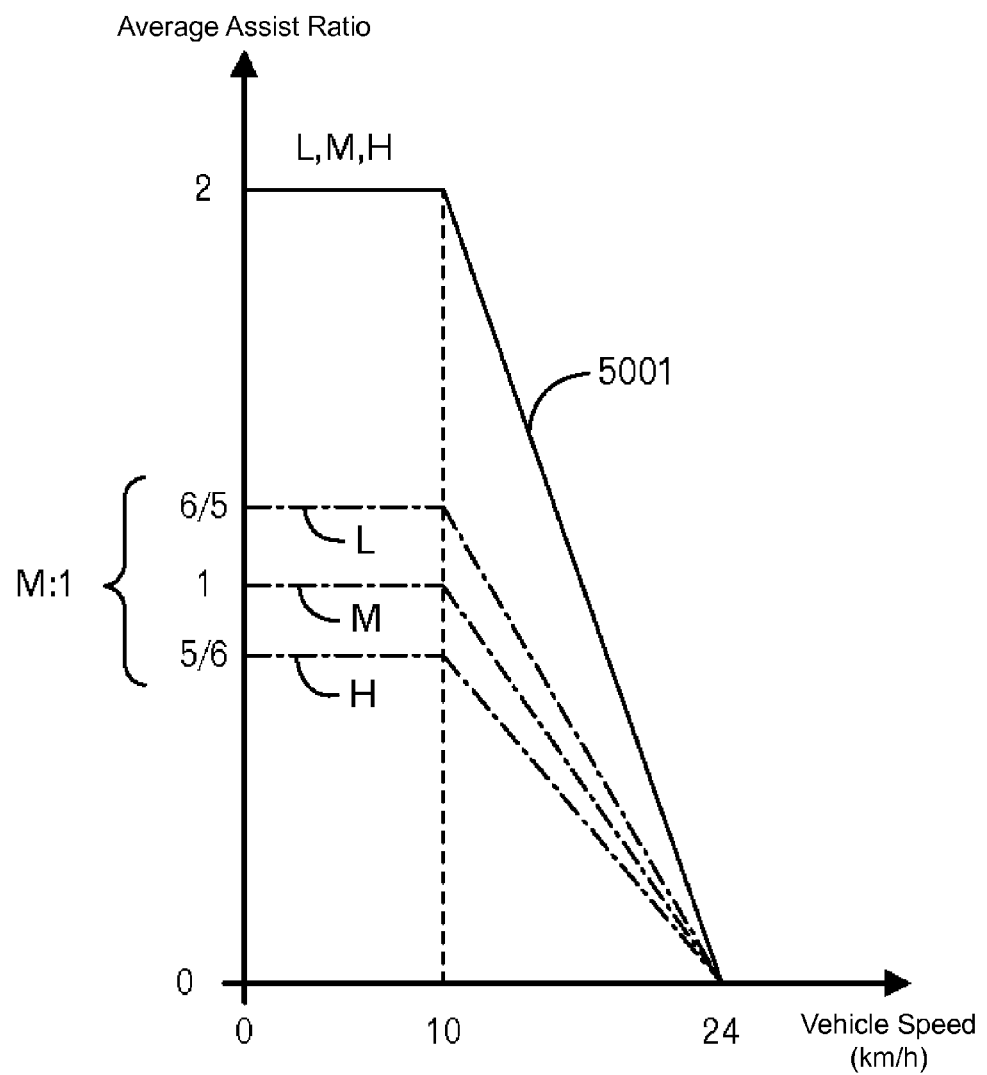
FIG. 18 is a drawing that shows an average assist ratio obtained by calculations according to Embodiment 3.

In the present embodiment, if the desired assist ratio is large, then the real assist ratio is set such that the upper limit value is reached at any gear position, as shown in FIG. 15, based on the output from the assist ratio upper limit correction coefficient selector 3306. On the other hand, if the desired assist ratio is restricted to a small value, then a real assist ratio is outputted such that the average assist ratio of the low speed L position becomes greater than that of the high speed H position as much as possible. In other words, as shown in FIG. 18, if the desired assist ratio is 2, then a curve 5001 is at the upper limit regardless of the gear position. On the other hand, if the desired assist ratio is 1, then similar to Embodiment 2, a lower speed gear position has a higher average assist ratio than the higher speed side.

Embodiment 4

Figure 19:
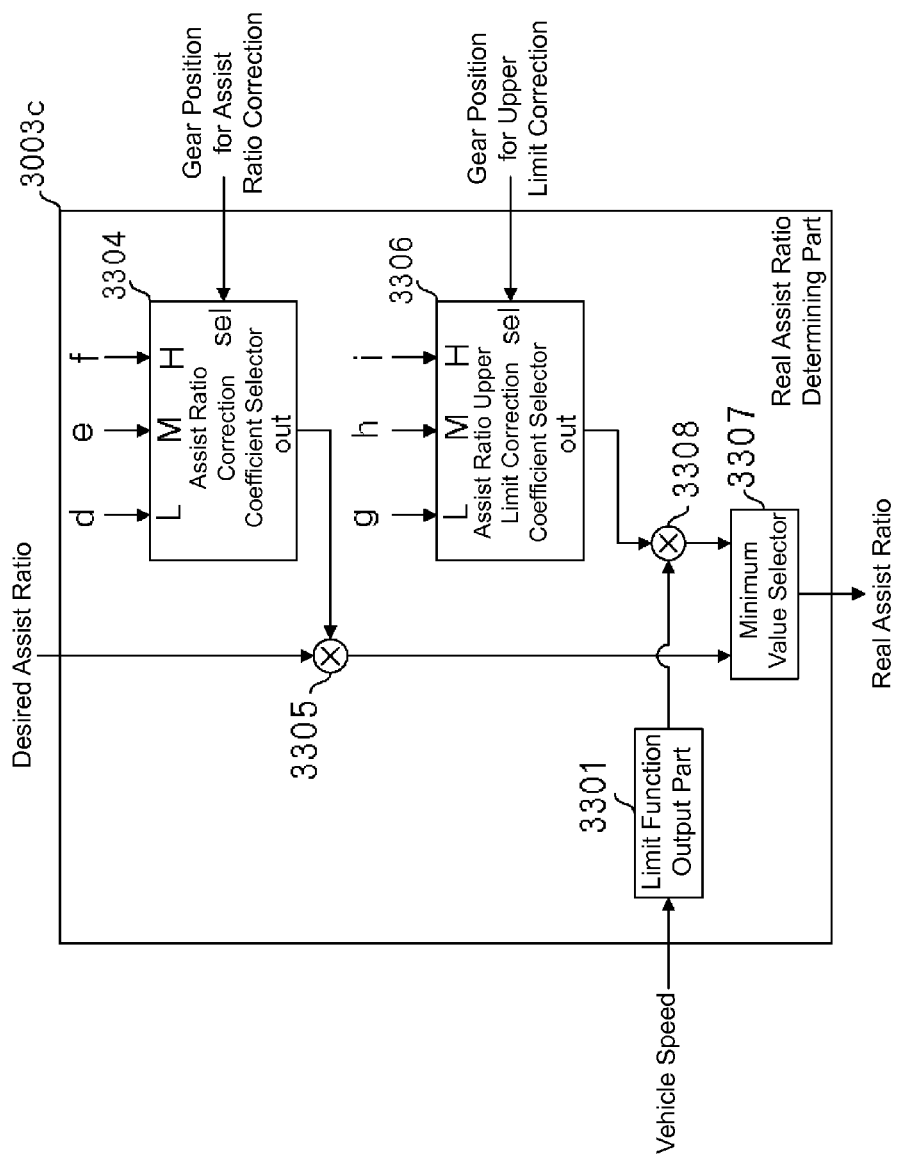
FIG. 19 is a block diagram of functions of a real assist ratio determining part according to Embodiment 4.

In the present embodiment, a real assist ratio determining part 3003c as shown in FIG. 19 is used instead of the real assist ratio determining part 3003 shown in FIG. 13. The same reference characters are assigned for the same functions.

The real assist ratio determining part 3003c according to the present embodiment has a limit function output part 3301, an assist ratio correction coefficient selector 3304, an assist ratio upper limit correction coefficient selector 3306, a multiplier 3305, a multiplier 3308, and a minimum value selector 3307. Basic components are almost all the same as Embodiment 3, but the L position assist ratio upper limit correction coefficient "g" is 8/3, the M position assist ratio upper limit correction coefficient "h" is 2, and the H position assist ratio upper limit correction coefficient "i" is 3/2. The maximum allowable assist ratio is 2, and thus, values twice those of Embodiment 3 are used. This is due to the different method of connection, and as a result, the outputted real assist ratio and the resultant average assist ratio are also different.

Figure 20:
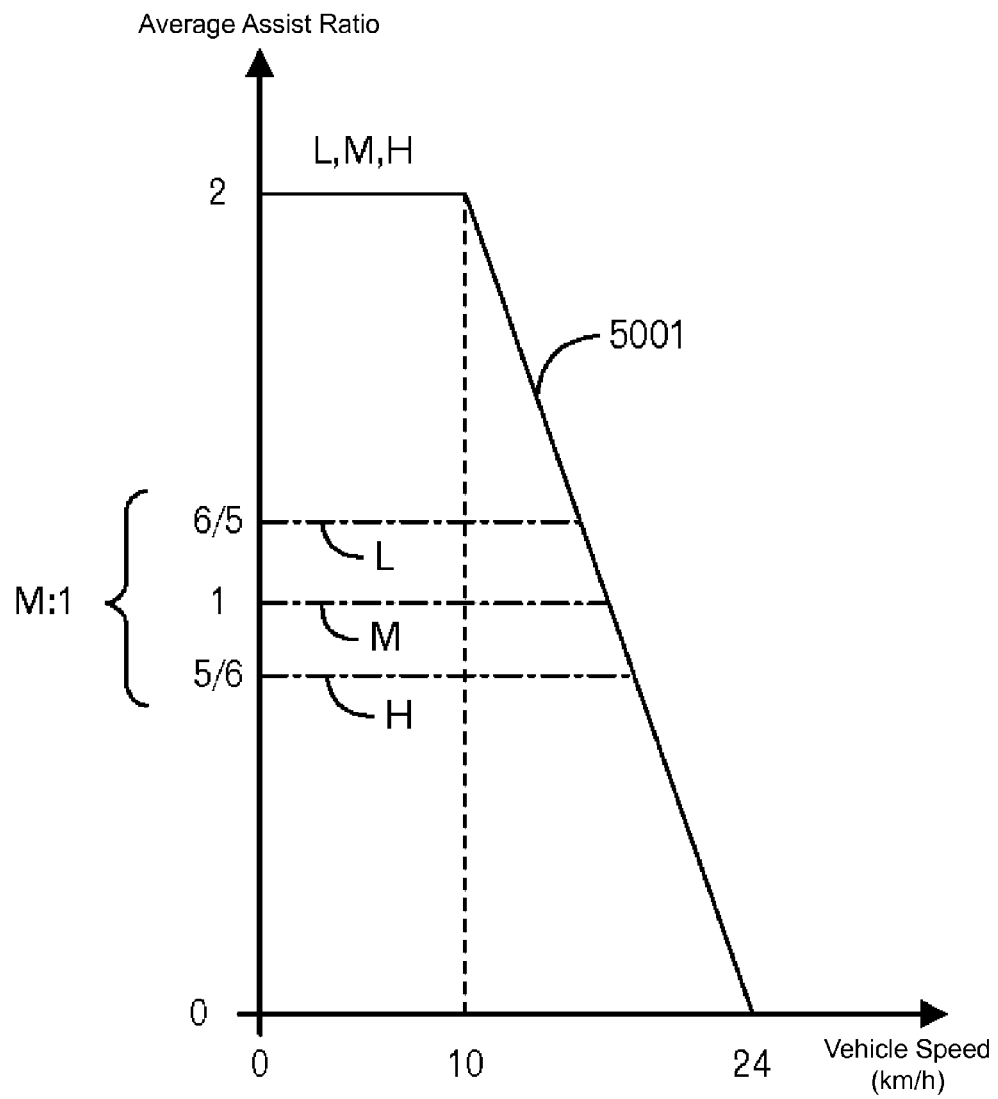
FIG. 20 is a drawing that shows an average assist ratio obtained by calculations according to Embodiment 4.

In the present embodiment, the output from the limit function output part 3301 is multiplied by the output of the assist ratio upper limit correction coefficient selector 3306, and thus, as long as an upper limit curve defined by the product thereof is not exceeded by the product of the desired assist ratio and the assist ratio correction coefficient, the product of the desired assist ratio and the assist ratio correction coefficient is maintained. In particular, in this example, even after exceeding 10 km/h, there are portions that are not affected by the output of the limit function output part 3301, and average assist ratios such as those shown in FIG. 20 can be attained. In other words, if the upper limit curve 5001 is exceeded, the average assist ratios change following the upper limit curve 5001 regardless of the gear position, but as in a case in which the average assist ratio in the M position is 1, for example, until the upper limit curve 5001 is reached, the average assist ratio is not affected by the limit function even if the vehicle reaches 10 km/h, and the average assist ratio maintains a constant value. Also, the real assist ratio is calculated such that the average assist ratio for the L position is greater than the average assist ratio for the H position.

An example was described in which the correction coefficient for the assist ratio and the like are selected depending on the gear position, but a configuration may be used in which a correction coefficient is generated as a function of a direct gear ratio that does not depend on gear position so as to be applicable in a case in which a CVT (continuously variable transmission), which does not have gear positions, or the like is used. This is also true for other embodiments.

Embodiment 5

In the present embodiment, an example is shown in which a drive torque target calculating part 1203b that differs from the above-mentioned embodiments is used. In the present embodiment, not only is the real assist ratio set based on a gear ratio, but the smoothness of the pedal input torque is determined based on the gear ratio.

Figure 21:
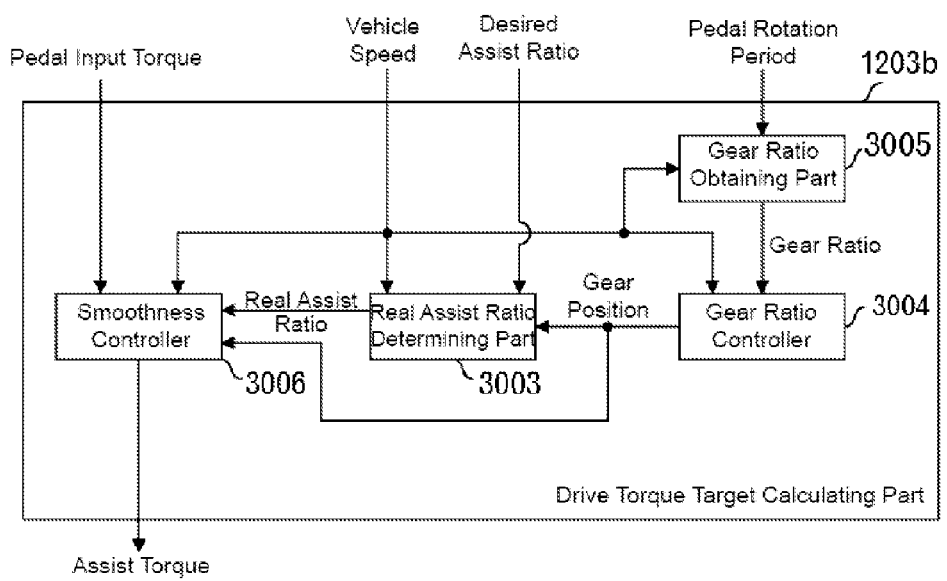
FIG. 21 is a block diagram of functions of a drive torque target calculating part according to Embodiment 5.

As shown in FIG. 21, the drive torque target calculating part 1203b according to the present embodiment has a gear ratio obtaining part 3005, a gear ratio controller 3004, a real assist ratio determining part 3003, and a smoothness controller 3006.

The gear ratio obtaining part 3005 is similar to that of Embodiment 1. The gear ratio controller 3004 is also similar to that of Embodiment 1. In addition, the real assist ratio determining part 3003 is similar to any one of Embodiments 1 to 4.

The smoothness controller 3006 introduced in the present embodiment calculates the assist torque from the pedal input torque, based on the gear position and the real assist ratio.

Figure 22:
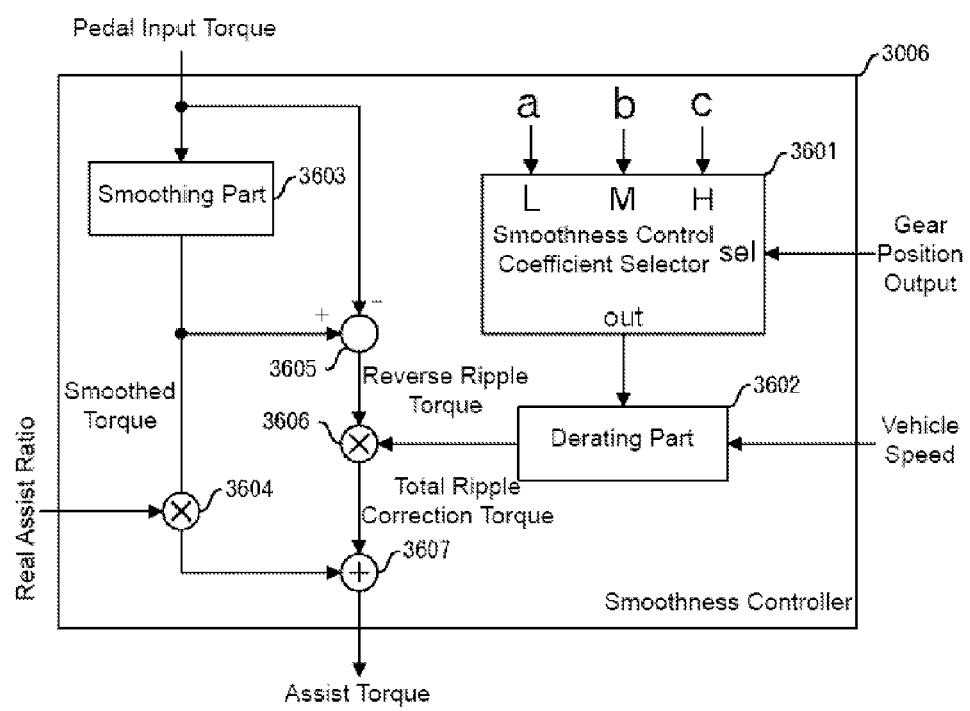
FIG. 22 is a block diagram of functions of a smoothness controller according to Embodiment 5.

As shown in FIG. 22, for example, the smoothness controller 3006 has a smoothness control coefficient selector 3601, a derating part 3602, a smoothing part 3603, an adder 3605, a multiplier 3606, a multiplier 3604, and an adder 3607.

The smoothness control coefficient selector 3601 outputs a smoothness control coefficient "a" in the L position, a smoothness control coefficient "b" in the M position, and a smoothness control coefficient "c" in the H position, based on the gear position.

The derating part 3602 outputs the total smoothness based on the output of the smoothness control coefficient selector 3601 and the vehicle speed.

Figure 23:
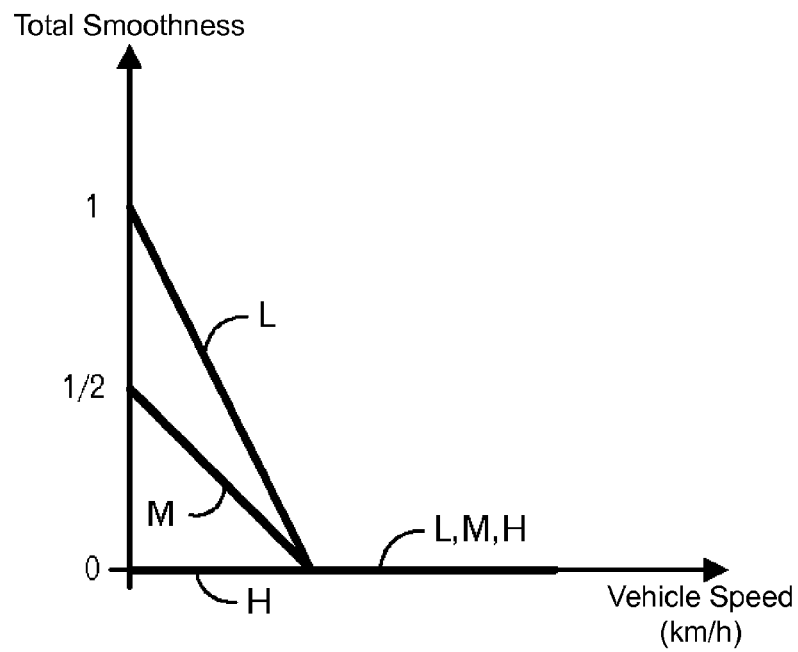
FIG. 23 is a drawing that shows one example of a total smoothness.

For example, if the smoothness control coefficient "a" for the L position is 1, the smoothness control coefficient "b" for the M position is 1/2, and the smoothness control coefficient "c" for the H position is 0, then a total smoothness such as that shown in FIG. 23 is outputted. In other words, when in the L position, the total smoothness decreases linearly from 1 from a vehicle speed of 0 to a prescribed speed, and if the vehicle speed reaches or exceeds the prescribed vehicle speed, the total smoothness becomes 0. Also, when in the M position, the total smoothness decreases linearly from 1/2 from a vehicle speed of 0 to a prescribed speed, and if the vehicle speed reaches or exceeds the prescribed vehicle speed, the total smoothness becomes 0. In addition, when in the H position, the total smoothness is 0 regardless of vehicle speed.

Figure 24:
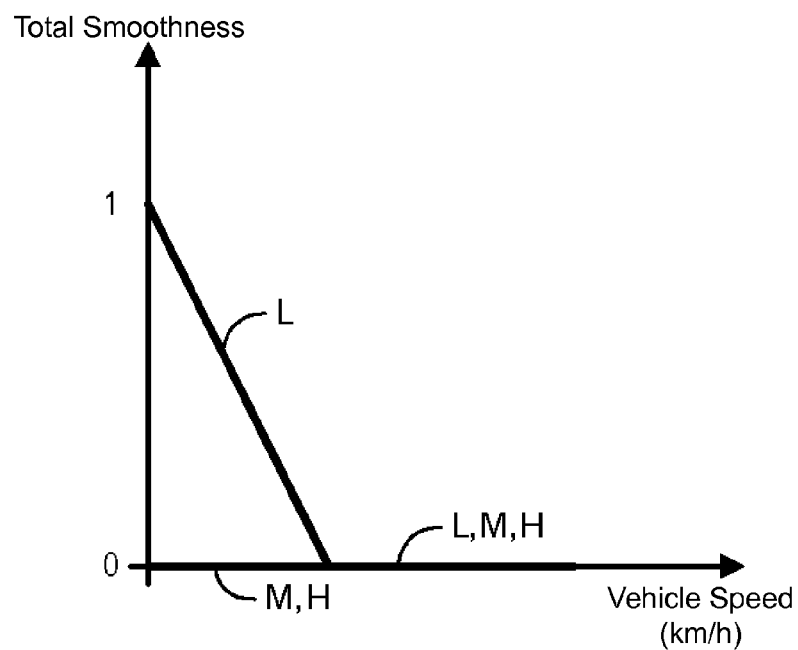
FIG. 24 is a drawing that shows one example of a total smoothness.

On the other hand, if the smoothness control coefficient "a" for the L position is 1, the smoothness control coefficient "b" for the M position is 0, and the smoothness control coefficient "c" for the H position is 0, then a total smoothness such as that shown in FIG. 24, for example, is outputted. In other words, when in the L position, the total smoothness decreases linearly from 1 from a vehicle speed of 0 to a prescribed speed, and if the vehicle speed reaches or exceeds the prescribed vehicle speed, the total smoothness becomes 0. When in the M position or the H position, the total smoothness is 0 regardless of vehicle speed.

The pedal input torque is smoothed in the smoothing part 3603, and a smoothed torque is thus generated. In the adder 3605, a reverse ripple torque is calculated by subtracting the pedal input torque from the smoothed torque. The multiplier 3606 generates a total ripple correction torque, which is the product of the reverse ripple torque and the total smoothness, which is the output of the derating part 3602. Meanwhile, the multiplier 3604 calculates the product of the real assist ratio and the smoothed torque. The adder 3607 adds the product of the real assist ratio and the smoothed torque to the total ripple correction torque to calculate the assist torque.

When in the L position, in many cases, a large amount of torque is required due to reasons such as climbing hills, and there is a problem that in the upper and lower dead points of the pedal, the pedal input torque falls to almost zero. When the torque reaches zero, a large decelerating forces acts, causing an instant drop in speed, which in the worst case can cause the speed to instantly drop to zero when climbing a steep hill. The decrease in speed results in a decrease in upright and forward stability, and due to the rotation slowing to a stop, pedaling becomes difficult.

Figure 25:
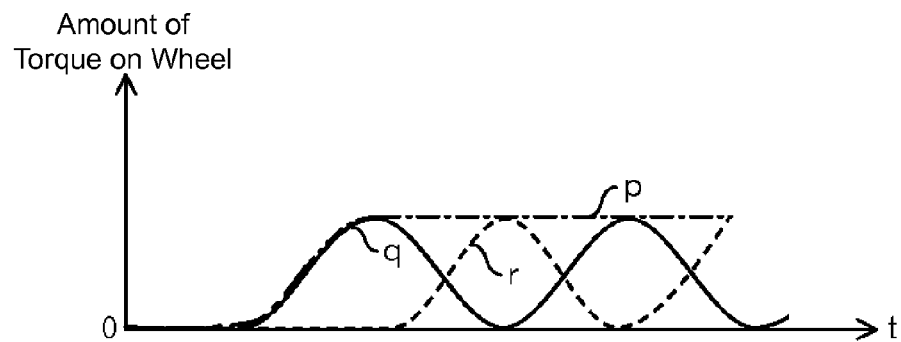
FIG. 25 is a drawing for describing the relation between the total smoothness and the total torque.

As shown in FIG. 25, when in the L position, the total smoothness is 1 or almost 1 when the vehicle speed is approximately 0. Thus, in order to avoid the above difficulties, an assist torque "r" is generated so as to eliminate ripples in the pedal input torque "q" generated by human-powered pedaling. In other words, the total ripple correction torque remains as a large value as it is added to the product of the smoothed torque and the real assist ratio. By doing so, a total torque "p" becomes flat, which allows smooth progress forward even when climbing hills. FIG. 25 shows an example in which the average assist ratio is 1.

Figure 26:
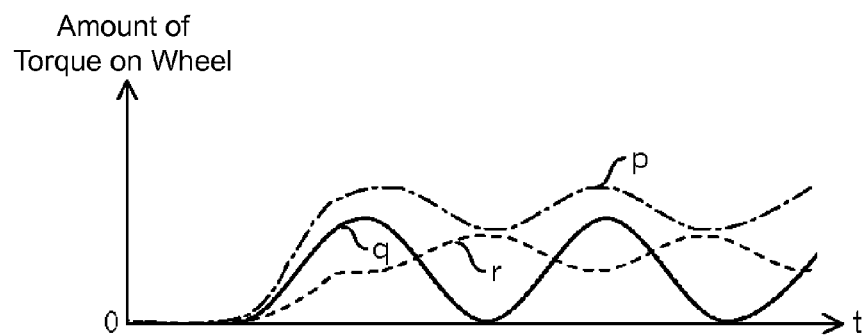
FIG. 26 is a drawing for describing the relation between the total smoothness and the total torque.

On the other hand, when the vehicle speed slightly rose, for example, and the total smoothness at the L position became 1/2, for example, then, as shown in FIG. 26, the total ripple correction torque is obtained by halving the reverse ripple torque. This total ripple correction torque is added to the product of the smoothed torque and the real assist ratio, to obtain the assist torque "r." Because this assist torque "r" is at an antiphase to the pedal input torque "q", the total torque "p" is at the same phase as the pedal input torque "q" and has some ripples.

Figure 27:
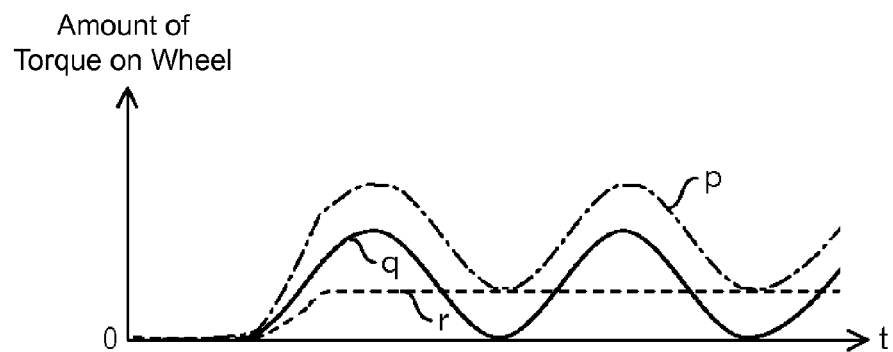
FIG. 27 is a drawing for describing the relation between the total smoothness and the total torque.

If the total smoothness in the L position is 0, for example, because the vehicle speed rose even further, for example, then as shown in FIG. 27, the reverse ripple torque becomes 0, and the assist torque "r" becomes the same as the product of the smoothed torque and the real assist ratio, and forms a flat curve. When this happens, the total torque "p" has a curve in which the pedal input torque "q" is increased by an assist torque "r".

As described above, in the H position in FIG. 23, and the H position and the M position in FIG. 24, the total smoothness is always set to zero, thereby flattening the assist torque "r." This makes it possible to minimize the amount of power consumption lost in the motor or the drive inverter.

The relation between the pedal input torque "q" to the assist torque "r", and the total torque "p" in each position was described above with reference to the drawings showing torque applied to wheels, but this description was based on a case in which the wheel driven by the motor and the wheel driven by the pedal have the same diameter. If the wheel driven by the motor and the wheel driven by the pedal are not the same diameter, this can be understood as a relation between the wheel drive power "q" due to pedal input torque, the wheel drive power "r" due to assist torque, and the total wheel drive power "p" of the total torque.

The above-mentioned calculation is one example, and by providing a torque mixing part that performs weighted addition of the pedal input torque and the smoothed torque with an appropriate coefficient (positive or negative), similar effects as stated above can be attained.

Embodiment 6

If the gear position output is outputted from the gear shifter itself or if the gear position output is directly outputted from a gear shift lever or a control panel, then it is always possible to obtain information on gear position. However, if the above-mentioned gear ratio obtaining part 3005 is made so as to obtain the gear ratio or gear position based on the ratio of the pedal rotation period and the wheel rotation period or the like, then if pedaling is stopped while running or the bike is stopped, then the gear position is temporarily unknown. After continuous pedaling is resumed, the gear ratio or the gear position is detected after a few pulses of the pedal rotation detection pulse (after the pedal has rotated 60°, for example).

Figure 28:
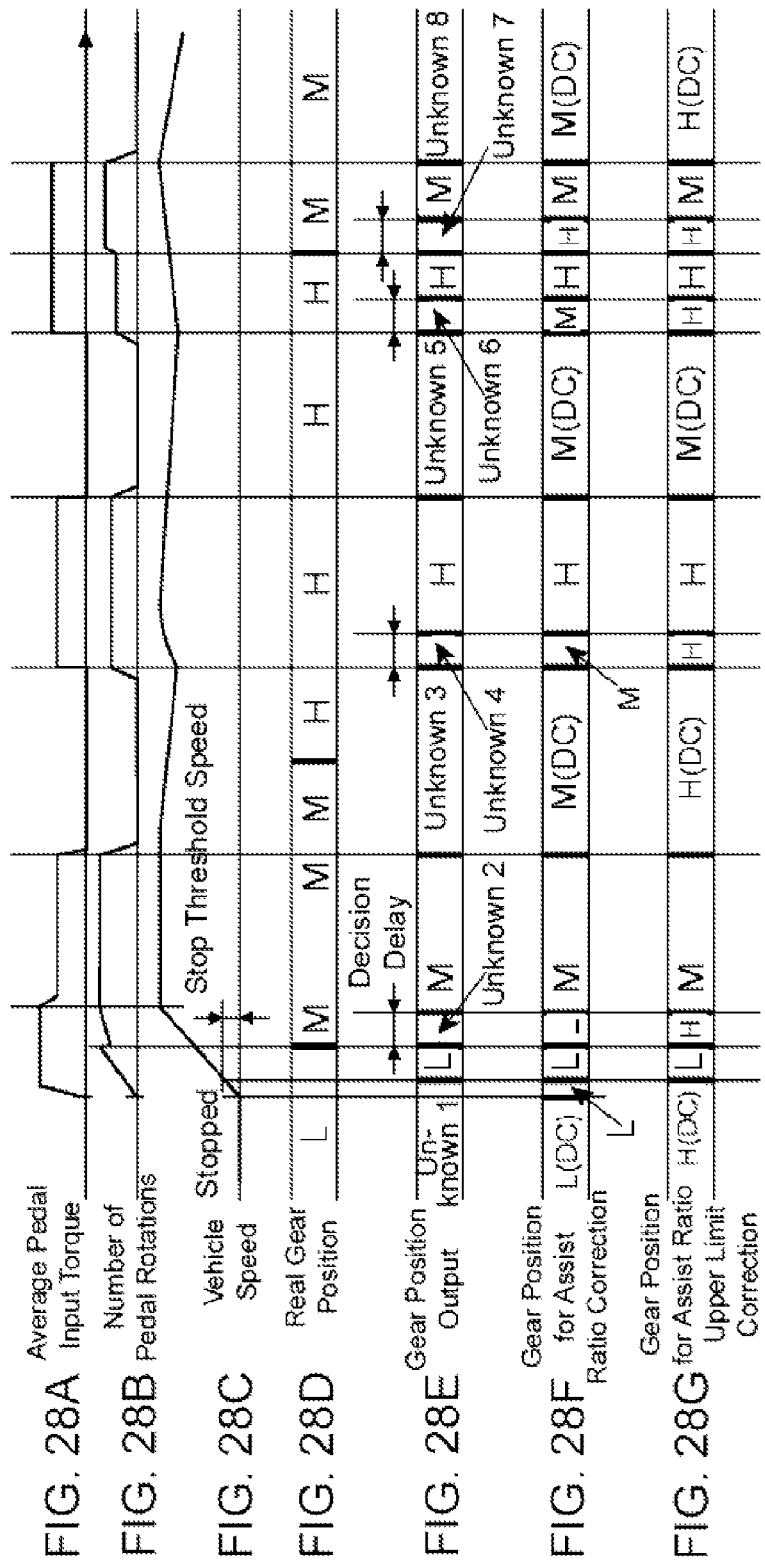
FIGS. 28A to 28G are drawings for describing control when a gear ratio is temporarily unknown in Embodiment 6.

An example of a vehicle in motion is shown in FIG. 28. Based on the average pedal input torque shown in FIG. 28A and the number of pedal rotations shown in FIG. 28B, there are three periods over which pedaling takes place. However, based on the vehicle speed shown in FIG. 28C, it can be seen that although a bicycle 1 with a motor is stopped at first, it is running even without pedaling. FIG. 28D shows an actual gear position. Also, DC (don't care) represents a portion in which there is no assist and the gear ratio does not have much real effect no matter what the gear ratio is, due to the fact that there is no pedal input torque in this portion.

In this case, as shown in FIG. 28E, there is an "unknown period 1" ("unknown 1" in the drawing) in which the bicycle is stopped and there is no pedaling, an "unknown period 2", which is directly after the number of pedal rotations has changed, an "unknown period 3" M which there is no pedaling, an "unknown period 4" in which pedaling has just commenced, an "unknown period 5" in which there is no pedaling, an "unknown period 6" in which pedaling has just commenced, an "unknown period 7", which is directly after the number of pedal rotations has changed, and an "unknown period 8" in which there is no pedaling. Of these, the temporarily unknown periods include the "unknown period 1", the "unknown period 2", the "unknown period 4", the "unknown period 6", and the "unknown period 7".

In such a case, in the present embodiment, when the gear ratio controller 3004 receives output from the gear ratio obtaining part 3005 representing that the gear ratio is unknown, the gear ratio controller 3004 outputs a gear position for assist ratio correction as shown in FIG. 28F, and outputs a gear position for assist ratio upper limit correction as shown in FIG. 28G.

For example, in Embodiments 1 to 5, the real assist ratio is set lower for the H position than the L position, and thus, as shown in FIG. 28G, during the temporarily unknown period, the gear position for assist ratio upper limit correction that affects the upper limit of the real assist ratio is set to the H position. As a result, the assist can be prevented from exceeding legal limits The gear ratio may be assumed to be the H position for other unknown periods.

Also, during the temporary period from a transient start of pedaling (the pedal torque input rises from 0 or a small amount and the vehicle speed stays within a fixed value) until the gear ratio is obtained again, the gear position for assist ratio correction may be assumed to be at the L position, for example. In such a case, during the start of pedaling when the vehicle speed is low, the average assist ratio is set so as to be high, which allows a smooth start of pedaling. For example, during the tail end of the "unknown period 1", there is a period in which such settings are used.

In addition, if the gear position is unknown when the vehicle speed is above a prescribed value, then the gear position directly before then is maintained. The "unknown period 2", the "unknown period 3", the "unknown period 4", the "unknown period 5", the "unknown period 6", the "unknown period 7", and the "unknown period 8" correspond to this. There are no problems unless gear shifting takes place while not pedaling, and even if gear shifting takes place while not pedaling, as soon as pedaling starts again, a new gear ratio can be obtained, which allows assist to take place without any discomfort to the rider.

Embodiment 7

In the embodiments above, cases in which a gear ratio obtaining part is provided were described, but there are possible cases in which a gear ratio obtaining part is not provided. In the case of electric power-assisted vehicles in which the gear ratio is permanently unknown, the assist torque cannot be calculated based on the gear ratio as described in Embodiments 1 to 6. Thus, in the present embodiment, a configuration described below will be used in which the gear ratio changes appropriately within known ranges (H, M, and L in the above-mentioned examples), and the following control is performed.

Figure 29:
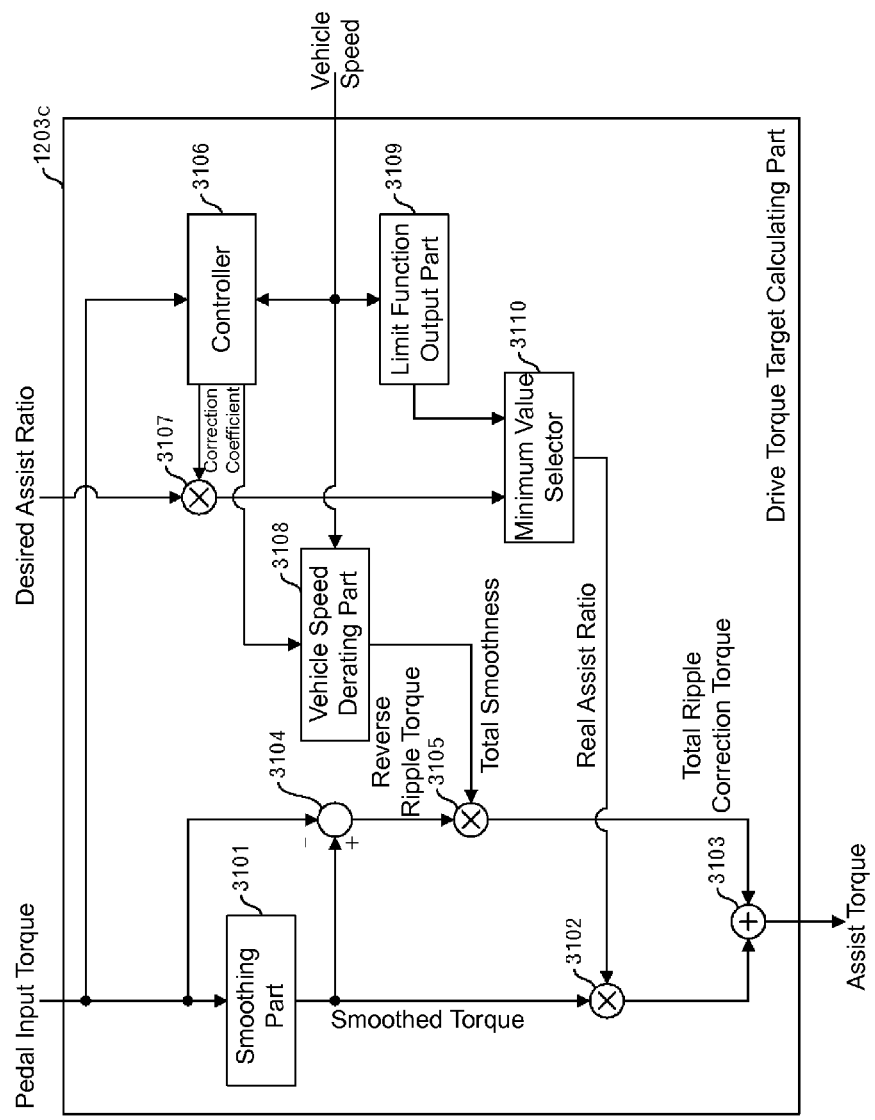
FIG. 29 is a block diagram of functions of a drive torque target calculating part according to Embodiment 7.

Specifically, a configuration example of a drive torque target calculating part 1203c according to the present embodiment will be shown in FIG. 29. The drive torque target calculating part 1203c according to the present embodiment has a smoothing part 3101, a multiplier 3102, an adder 3104, a multiplier 3105, an adder 3103, a vehicle speed derating part 3108, a multiplier 3107, a controller 3106, a limit function output part 3109, and a minimum value selector 3110.

The smoothing part 3101 calculates the smoothed torque by smoothing the pedal input torque. The adder 3104 outputs the reverse ripple torque by making the calculation of: smoothed torque−pedal input torque. The multiplier 3105 calculates the product of the reverse ripple torque and the output from the vehicle speed derating part 3108 (total smoothness), and outputs the total ripple correction torque.

The multiplier 3102 calculates the product of the smoothed torque and the real assist ratio, which is the output of the minimum value selector 3110, and outputs it. The adder 3103 outputs the assist torque, which is the sum of the product of the smoothed torque and the real assist ratio, and the total ripple correction torque. Such calculations are similar to those of the smoothness controller 3006 in Embodiment 5.

The controller 3106 calculates the gear ratio based on the pedal input torque and the vehicle speed, and outputs the correction coefficient and the total smoothness corresponding to the calculated gear ratio. Specifically, if the vehicle speed is lower than a prescribed speed, it outputs values corresponding to the L position. Also, it outputs values corresponding to the L position from the start of pedaling (from when the pedal input torque is 0 or a small value) until a fixed time. The controller 3106 outputs values corresponding to the M position in other cases. However, if there is pedal input torque and the vehicle speed is above a threshold, then the controller 3106 may output values corresponding to the H position. In the present embodiment, a correction coefficient of 8/5 is outputted for the L position, a correction coefficient of 1 is outputted for the M position, and a correction coefficient of 5/8 is outputted for the H position. However, if the correction coefficient changes based on estimated position changes, the correction coefficient is changed gradually and outputted, such that the correction coefficient changes continuously.

Also, the coefficient for the total smoothness may be 1 in the L position and 0 in the M position or the H position, as in Embodiment 5. Alternatively, a coefficient of 1 may be outputted for the L position, 1/2 may be outputted for the M position, and 0 may be outputted for the H position.

Also, the vehicle speed derating part 3108 follows a curve shown in FIG. 23 or 24 and outputs the total smoothness corresponding to the coefficient based on the vehicle speed, similar to the derating part 3602 in Embodiment 5.

Figure 30:
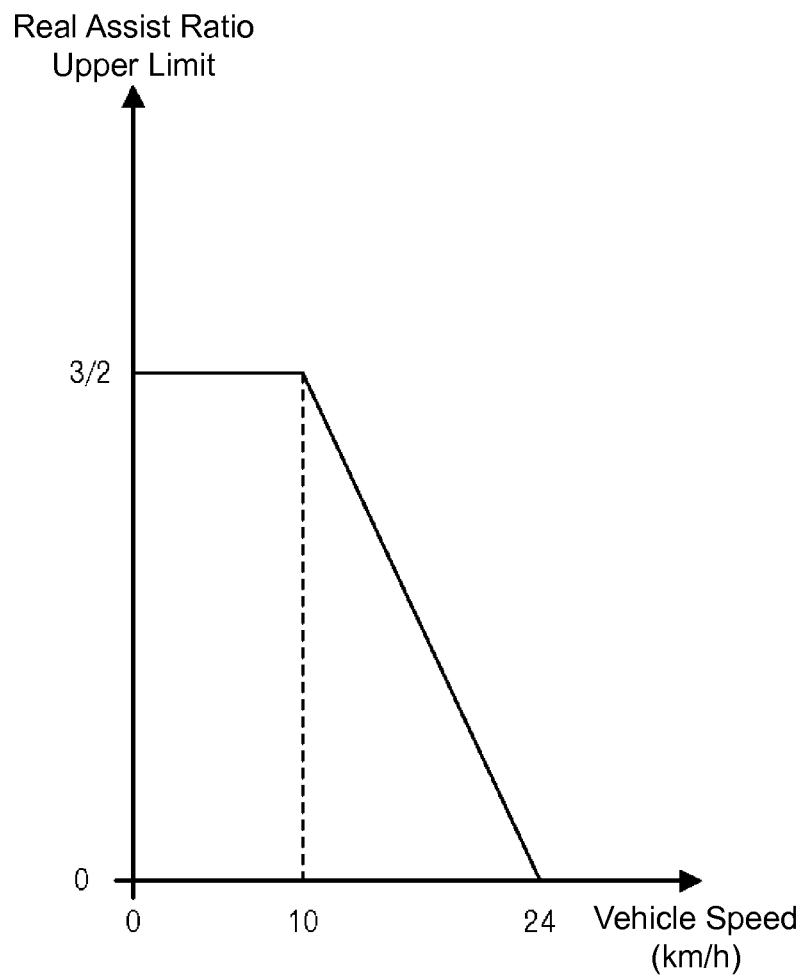
FIG. 30 is a drawing for describing a total smoothness outputted by a vehicle speed derating part.

In addition, the limit function output part 3109 of the present embodiment outputs an upper limit value for the real assist ratio according to vehicle speed. It outputs values as shown in FIG. 30, for example. In the example in FIG. 30, it outputs 3/2 up to vehicle speeds of 10 km/h, and between 10 km/h and 24 km/h inclusive, the outputted value decreases linearly down to 0. The upper limit value of 3/2 is for the H position (gear ratio 4/3) when the desired assist ratio for the M position is 2, and is calculated as follows: 2/(4/3)=3/2.

The minimum value selector 3110 outputs the smaller of the output of the multiplier 3107 (product of desired assist ratio and correction coefficient) and the output of the limit function output part 3109 as the real assist ratio to the multiplier 3102.

Figure 31:
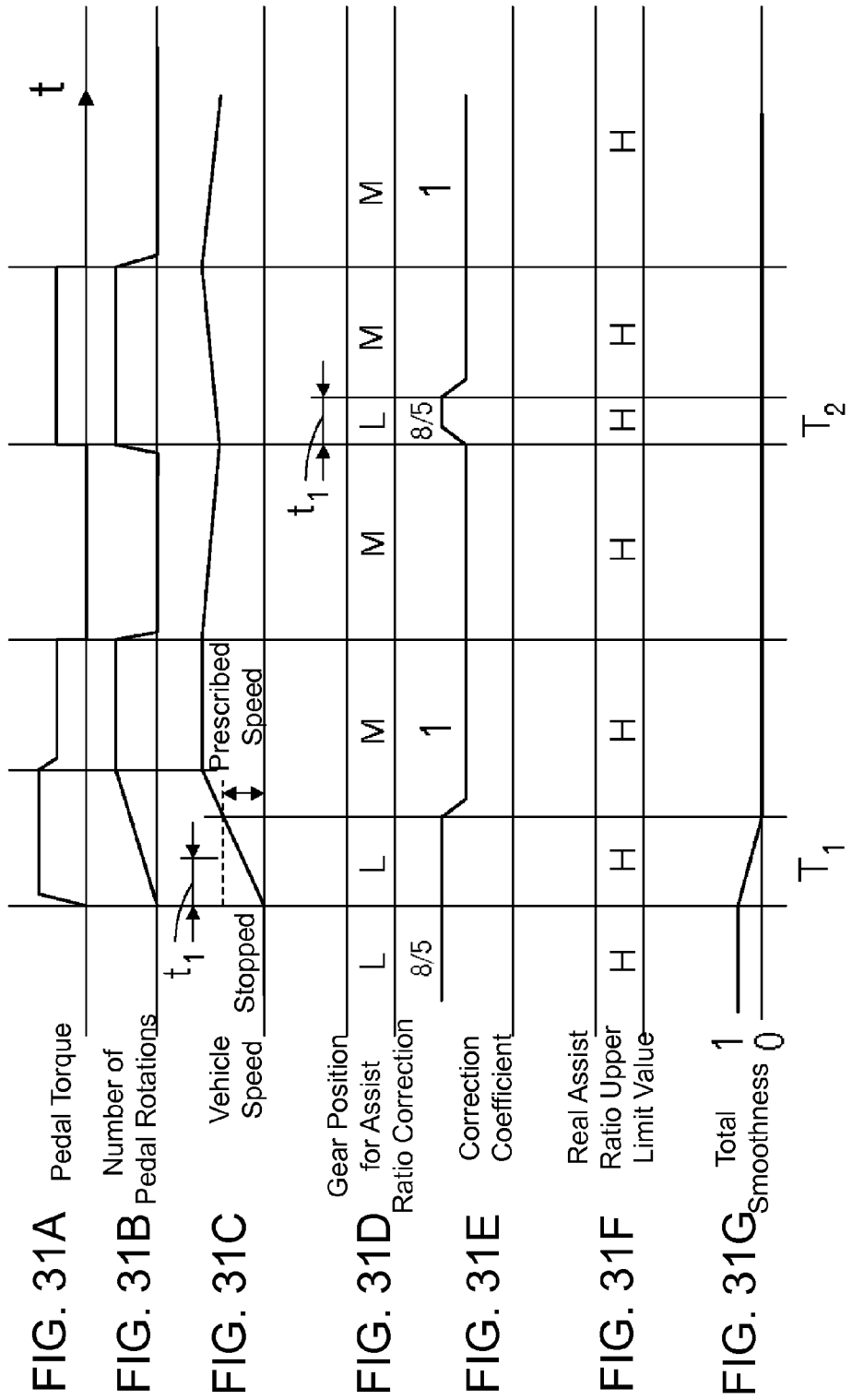
FIGS. 31A to 31G are drawings that show vehicle running examples according to Embodiment 7.

A running example shown in FIG. 31 will be described, for example. In this running example, pedaling begins from a standstill, pedaling is stopped momentarily without the bicycle stopping, and pedaling begins again. This is clear from the average pedal input torque of FIG. 31A, the number of pedal rotations in FIG. 31B, and the vehicle speed of FIG. 31C.

Figure 1:
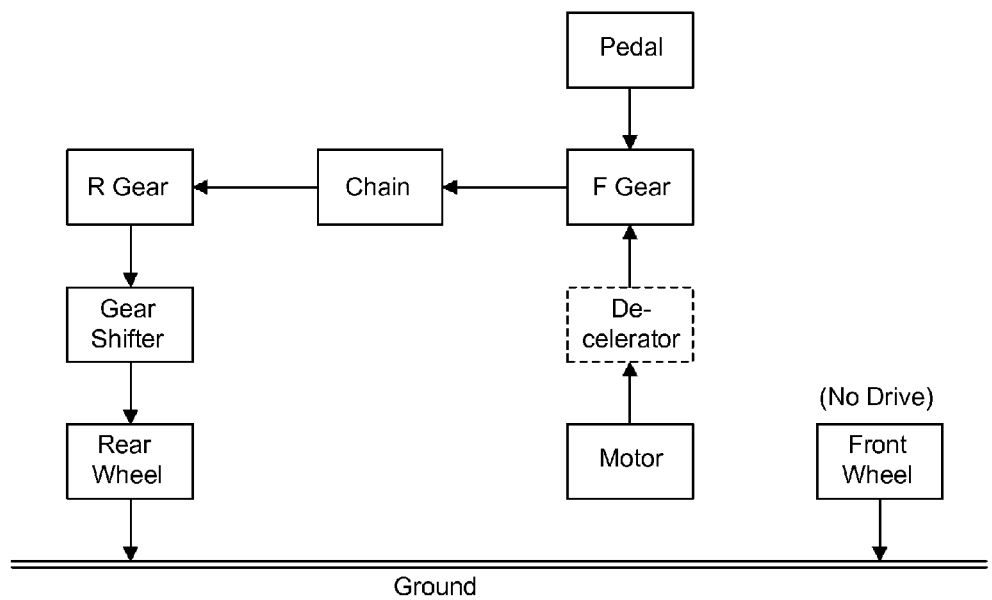
FIG. 1 is a drawing for describing one example of a power transmission system.
Figure 2:
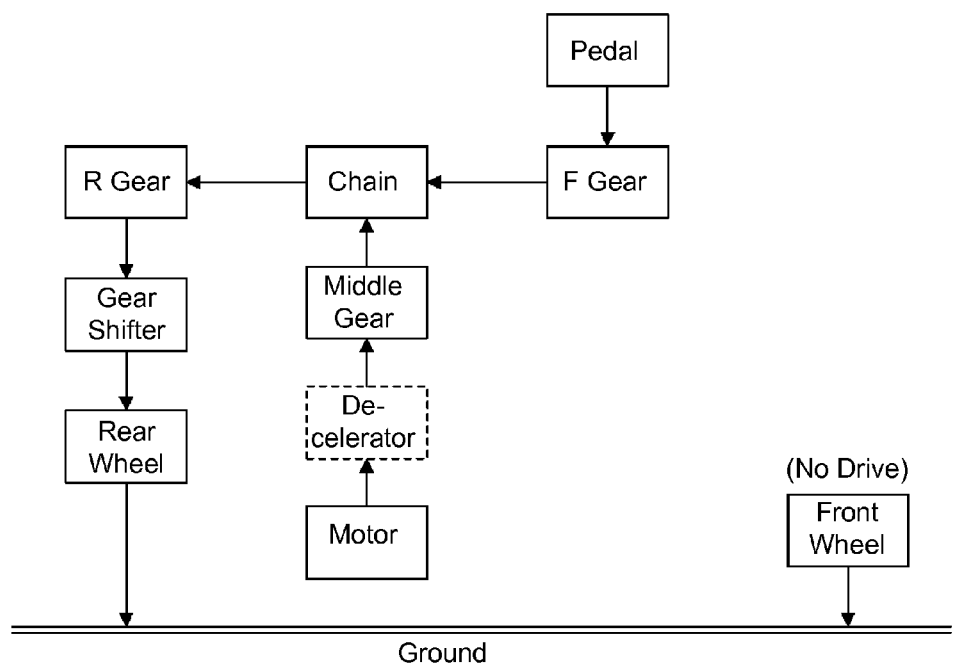
FIG. 2 is a drawing for describing one example of a power transmission system.
Figure 3:
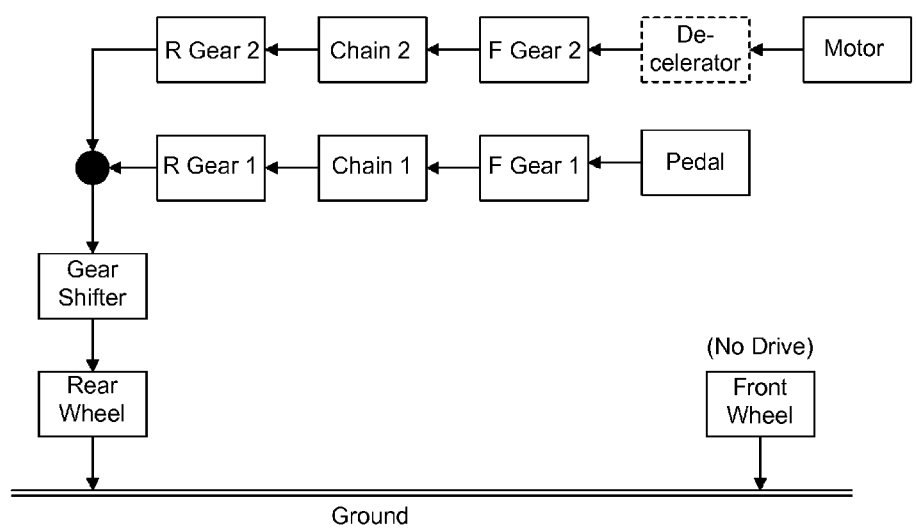
FIG. 3 is a drawing for describing one example of a power transmission system.

In the present embodiment, as stated above, during a fixed time period $t_1$ from when the bicycle is stopped to when the bicycle reaches a prescribed speed or from when pedaling is started, the gear position for assist ratio correction assumed to be the L position. Thus, as shown in FIG. 31D, the first L position, the second L position, and the L position that occurs after pedaling is stopped and then started again follow such rules. The gear position is assumed to be the M position for other portions. As shown in FIG. 31E, a correction coefficient is determined based on the assumed gear position. The limit function output part 3109, as shown in FIG. 31F, always assumes the H position and outputs the upper limit value of the real assist. In addition, the total smoothness outputted by the vehicle speed derating part 3108 becomes, as shown in the period $T_1$ in FIG. 31G, 1 when in the L position and the vehicle speed is 0 or a small value, and gradually decreases to 0 as the vehicle speed increases. However, even if the L position is assumed, if the vehicle speed is great such as in the period $T_2$, the total smoothness remains 0. In the M position or the H position, the total smoothness remains 0.

Through such calculations, even if the gear ratio is permanently unavailable, it is possible to provide an assist for as smooth and comfortable a ride as possible even when accelerating from a stop or climbing a hill. In addition, it is set so as to not exceed the maximum allowed upper limit value for the assist ratio.

Another Embodiment

Figure 32:
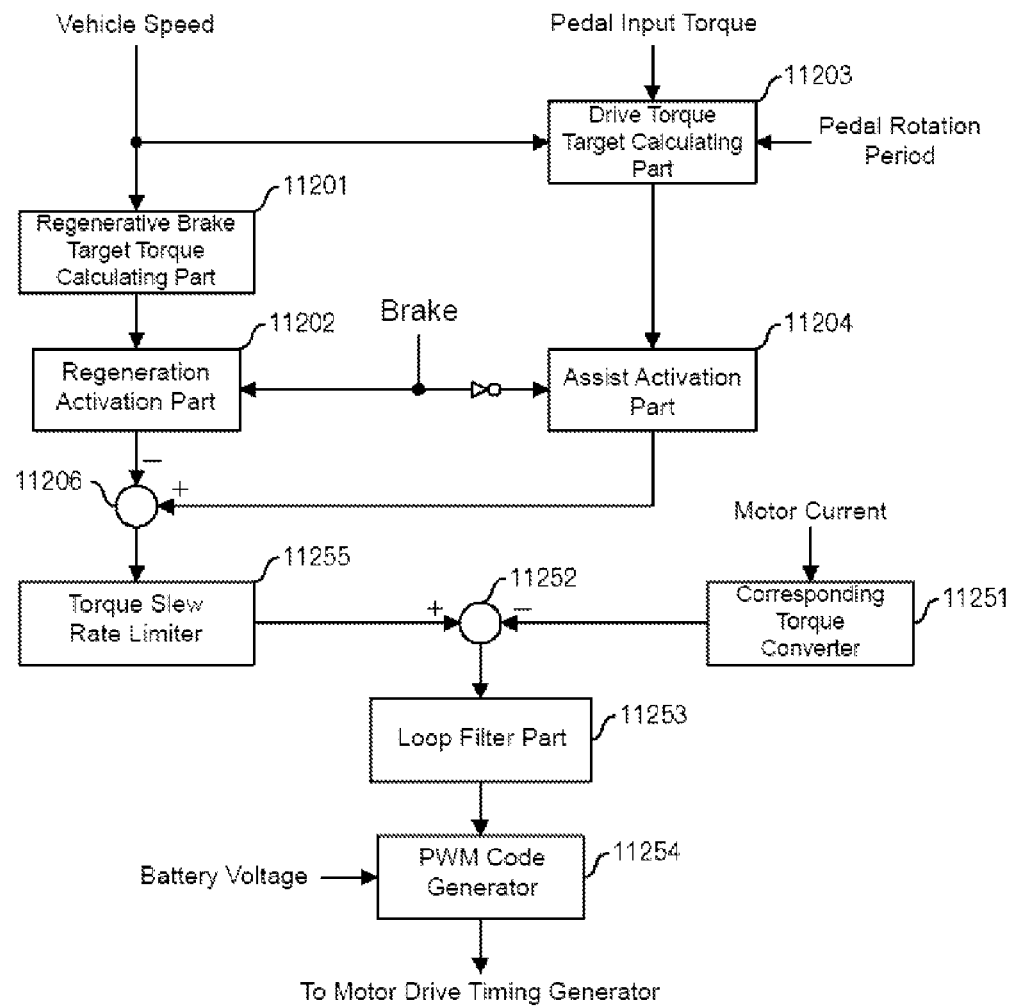
FIG. 32 is a block diagram of functions for describing other embodiments.

In Embodiments 1 to 7, examples were shown in which the drive torque target calculating part 1203 is applied for feed forward control, but it is also possible to use this drive torque target calculating part 1203 for feedback control. In the present embodiment, a configuration of a calculating part 1021 shown in FIG. 32 is used.

This calculating part 1021 has a regenerative brake target torque calculating part 11201, a regeneration activation part 11202, a drive torque target calculating part 11203, an assist activation part 11204, an adder 11206, a torque slew rate limiter 11255, a corresponding torque converter 11251, an adder 11252, a loop filter part 11253, and a PWM code generator 11254.

The vehicle speed and the rotation period of the wheel from the vehicle speed input part 1024, the pedal torque value from the torque input part 1027, and the pedal rotation input from the pedal rotation input part 1022 are inputted into the drive torque target calculating part 11203, thus calculating the assist torque value. The calculation performed by the drive torque target calculating part 11203 is similar to that in the drive torque target calculating part 1203.

Also, the regenerative brake target torque calculating part 11201 calculates a regenerative brake target torque value according to a curve set in advance, for example, based on the vehicle speed value from the vehicle speed input part 1024. The curve represents a relation in which the curve has reversed polarity to the vehicle speed value and is half or less ("half or less" sometimes includes cases in which the curve exceeds "half" by a few percentage points, for example) of the absolute value of the vehicle speed. By doing so, no matter what the speed, regeneration can occur at a certain efficiency. This process is not the main point of the present embodiment and therefore will not be described any further.

In the present embodiment, if an input signal representing the fact that the brake is active is inputted from the brake input part 1028, then the regeneration activation part 11202 outputs a regenerative brake target torque value from the regenerative brake target torque calculating part 11201 to the adder 11206. In other cases, the regeneration activation part 11202 outputs 0. On the other hand, if an input signal signifying that the brake is not active is inputted from the brake input part 1028, then the assist activation part 11204 outputs an assist torque value from the drive torque target calculating part 11203. In other cases, the assist activation part 11204 outputs 0.

The adder 11206 reverses the polarity of the regenerative brake target torque value from the regeneration activation part 11202 and then outputs it, but outputs the assist torque value from the assist activation part 11204 as is. In order to simplify the description, the assist torque value and the regenerative brake target torque value will be referred to as a target torque value below.

The torque slew rate limiter 11255 conducts a well-known slew rate limiting process on the target torque value from the adder 11206, and outputs the result thereof to the adder 11252.

The corresponding torque converter 11251 conducts a conversion process that converts a value corresponding to a motor current from the current detector 1023 to a corresponding torque value, and outputs the result thereof to the adder 11252. The adder 11252 subtracts an output from the corresponding torque converter 11251 from the output from the torque slew rate limiter 11255, and outputs the calculation result to the loop filter part 11253. The loop filter part 11253 conducts integration on the output from the adder 11252 and outputs the result thereof to the PWM code generator 11254. The PWM code generator 11254 multiplies the output from the loop filter part 11253 by a battery voltage/reference voltage (24V, for example) from the AD input part 1029 and generates a PWM code. The PWM code is outputted to the motor drive timing generator 1026.

By doing so, during feedback control, the above-mentioned effects of the drive torque target calculating part 1203 can be obtained as is.

Embodiments of the present invention were described above, but the present invention is not limited thereto. For example, the above-mentioned function block diagram divides functions into blocks for ease of description, but this sometimes differs from the actual circuit configuration. Also, when using a program, there are cases in which these functions do not correspond to program modules. In addition, there are a plurality of specific calculation methods for realizing the above-mentioned functions, any of which may be used.

Also, in some cases there are specialized circuits for portions of the calculating part 1021, and in other cases, such functions are provided through programs executed by a microprocessor.

The above-mentioned three speed gear shifter is only one example, and any gear shifter may be used as long as there are two or more speeds.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A motor drive control device of an electric power-assisted vehicle having a gear shifter and a motor in which a first ratio of a number of drive rotations in the motor to a number of rotations of a pedal changes according to changes in a gear ratio of the gear shifter, the device comprising:
    a gear ratio obtaining part that obtains a gear ratio of the gear shifter; and
    a calculating part that calculates an assist torque, which is a target value for a drive torque of the motor, from a pedal input torque, based on the gear ratio obtained from the gear ratio obtaining part.

2. The motor drive control device according to claim 1, wherein, in the electric power-assisted vehicle, if the gear ratio of the gear shifter shifts to a higher speed, then the first ratio becomes greater, and if the gear ratio shifts to a lower speed, then the first ratio becomes less, and wherein the calculating part calculates the assist torque by factoring in an effect of the gear shifter on the drive torque of the motor driven based on the assist torque, in a reverse direction based on the gear ratio.

3. The motor drive control device according to claim 1, wherein the calculating part sets a second ratio of an average assist torque, which represents a one cycle average of the assist torque, to an average pedal input torque, which represents a one cycle average of the pedal input torque, so as to be lower when the gear ratio is set higher compared to when the gear ratio is set lower, and the calculating part then calculates the assist torque based on the second ratio.

4. The motor drive control device according to claim 3, wherein the calculating part sets the second ratio so as to be proportional to a value resulting from raising the gear ratio by an exponent of −1 or less.

5. The motor drive control device according to claim 4, wherein the calculating part limits the second ratio by a separately set upper limit value for the second ratio.

6. The motor drive control device according to claim 3, wherein the calculating part sets the second ratio so as to be proportional to a value resulting from raising the gear ratio by an exponent of −1 or less, and limits the second ratio by a product of a third ratio that is inversely proportional to the gear ratio and a limiting value based on the vehicle speed.

7. The motor drive control device according to claim 1, wherein the calculating part changes an amount of periodic fluctuation in a total drive power constituted of a wheel drive power by a pedal input torque, which includes periodic torque variation, and a wheel drive power by the assist torque, based on the gear ratio.

8. The motor drive control device according to claim 3, wherein the calculating part determines, based on the gear ratio, a coefficient by which to multiply a difference between a smoothed pedal input torque in which the pedal input torque is smoothed, and the pedal input torque, and wherein the calculating part calculates the assist torque by adding a product of said difference and said coefficient, to a product of the smoothed pedal input torque and the second ratio.

9. The motor drive control device according to claim 8, wherein the coefficient is set so as to be smaller when the gear ratio is set higher, compared to when the gear ratio is set lower.

10. The motor drive control device according to claim 5, wherein, in a state in which the gear ratio obtaining part cannot obtain the gear ratio, the upper limit value is set based on a gear ratio at the highest speed, or the gear ratio when calculating a third ratio is set based on a gear ratio at the highest speed.

11. The motor drive control device according to claim 1, wherein, when the gear ratio obtaining part cannot obtain the gear ratio, the calculating part calculates the assist torque with a prescribed gear ratio at mid speed or a speed lower than mid speed in a state in which the vehicle is at a standstill or the vehicle speed is lower than a prescribed value, and the pedal input torque is 0 or has started to rise from a small value.

12. The motor drive control device according to claim 1, wherein, in a state in which the gear ratio obtaining part cannot obtain the gear ratio, the calculating part uses a gear ratio obtained immediately prior to that state.

13. A motor drive control device of an electric power-assisted vehicle having a gear shifter and a motor in which a first ratio of a number of drive rotations in the motor to a number of rotations of a pedal changes according to changes in a gear ratio of the gear shifter, the device comprising:

a controller that assumes a gear ratio lower than mid speed when conditions including that a prescribed amount of time has not passed since a pedal input torque has started increasing from 0 or a small value are satisfied, and assumes that a gear ratio is equal to or greater than mid speed when said conditions are no longer satisfied; and a calculating part that calculates an assist torque, which is a target value for a drive torque of the motor from the pedal input torque, based on the assumed gear ratio.

14. The motor drive control device according to claim 13, wherein, in the electric power-assisted vehicle, if the gear ratio of the gear shifter shifts to a higher speed, then a first ratio of a pedal input torque to a drive torque of the motor becomes higher, and if the gear ratio shifts to a lower speed, then the first ratio of the pedal input torque to the drive torque of the motor becomes lower, wherein the controller outputs a correction coefficient, which is set factoring in an effect of the gear shifter on a drive torque of the motor driven based on the assist torque, in a reverse direction to the assumed gear ratio, and wherein the calculating part corrects, based on the correction coefficient, a second ratio of an average assist torque, which represents a one cycle average of the assist torque, to an average pedal input torque, which represents a one cycle average of the pedal input torque.

15. The motor drive control device according to claim 13, wherein the calculating part sets a second ratio of an average assist torque, which represents a one cycle average of the assist torque, to an average pedal input torque, which represents a one cycle average of the pedal input torque, so as to be lower when the gear ratio is assumed to be higher compared to when the gear ratio is assumed to be lower, and calculates the assist torque based on the second ratio.

16. The motor drive control device according to claim 13, wherein said conditions further include a condition that a vehicle speed is less than a prescribed value.

17. The motor drive control device according to claim 13, wherein the calculating part limits a second ratio of an average assist torque, which represents a one cycle average of the assist torque, to an average pedal input torque, which represents a one cycle average of the pedal input torque, by an upper limit value set based on a highest speed gear ratio.

* * * * *